United States Patent
Bader

(10) Patent No.: US 10,926,222 B1
(45) Date of Patent: *Feb. 23, 2021

(54) MINIMIZING WASTES: METHODS FOR DE-TOXIFYING, DE-SCALING AND DISTILLING SOURCE WATER

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/873,308

(22) Filed: Mar. 16, 2020

Related U.S. Application Data

(63) Continuation-in-part of application No. 16/873,136, filed on Feb. 8, 2020, and a continuation-in-part of
(Continued)

(51) Int. Cl.
*B01D 61/10* (2006.01)
*C02F 9/00* (2006.01)
(Continued)

(52) U.S. Cl.
CPC ............. *B01D 61/10* (2013.01); *C02F 9/00* (2013.01); *B01D 2311/08* (2013.01); *B01D 2311/12* (2013.01); *B01D 2311/2642* (2013.01); *B01D 2311/2653* (2013.01); *B01D 2311/2673* (2013.01); *B01D 2311/2692* (2013.01); *C02F 1/042* (2013.01); *C02F 1/06* (2013.01);
(Continued)

(58) Field of Classification Search
USPC ................. 210/639–642; 203/10, 21, 85–88
See application file for complete search history.

(56) References Cited

U.S. PATENT DOCUMENTS 3,839,160 A * 10/1974 Izumi .................... B01D 3/065
202/173
4,332,642 A * 6/1982 Cane ..................... B01D 3/065
202/173
(Continued)

OTHER PUBLICATIONS

Walcott, James W. and Gorgol, Robert G.; "An Evaporation/Crystallization Route to Zero Discharge Power Generation"; AIChE Summer National Meeting, Denver, Aug. 1988.
(Continued)

*Primary Examiner* — Nina Bhat

(57) ABSTRACT

Dumping a reverse osmosis (RO) reject stream from a wastewater treatment and reclamation plant (WWTRP) into the sea directly destroys aquatic life and indirectly affects public health. This triggers solving the problem by methods and systems provided herein. One embodiment begins with utilizing two types of waste; one is the RO reject stream in its entirety, and the other is letdown steam from once-through-steam-generators (OTSGs) or steam from a stand-alone OTSG fueled by co-produced sour gas. It ends with thermally sterilizing toxicity and isolating it by the alkalinity content of the RO reject stream itself, combating sulfate scale and recovering it as a useful product, and producing distillate for heavy oil recovery by steam injection and de-scaled brine for improved oil recovery by water flooding. The vehicle to attain this set of solutions is a recycle-brine multi-stage flash (RB-MSF) desalination train with two modified flashing stages.

20 Claims, 12 Drawing Sheets

Related U.S. Application Data application No. 16/873,135, filed on Feb. 8, 2020, and a continuation-in-part of application No. 16/501,595, filed on May 6, 2019, now Pat. No. 10,577,257, and a continuation-in-part of application No. 16/501,510, filed on Apr. 20, 2019, now Pat. No. 10,577,269, which is a continuation-in-part of application No. 15/731,999, filed on Sep. 7, 2017, now Pat. No. 10,322,952, which is a continuation-in-part of application No. 15/731,626, filed on Jul. 10, 2017, now Pat. No. 10,336,638, and a continuation-in-part of application No. 14/998,774, filed on Feb. 13, 2016, now Pat. No. 10,280,103, which is a continuation-in-part of application No. 14/544,436, filed on Jan. 6, 2015, now Pat. No. 10,259,735, which is a continuation-in-part of application No. 14/544,317, filed on Dec. 22, 2014, now Pat. No. 10,259,734, and a continuation-in-part of application No. 13/999,309, filed on Feb. 8, 2014, now Pat. No. 9,701,558, and a continuation-in-part of application No. 13/066,841, filed on Apr. 26, 2011, now Pat. No. 8,915,301.

(51) Int. Cl.

| | | |
|---|---|---|
| C02F 1/06 | (2006.01) | |
| C02F 1/20 | (2006.01) | |
| C02F 1/52 | (2006.01) | |
| C02F 101/10 | (2006.01) | |
| C02F 101/38 | (2006.01) | |
| C02F 1/44 | (2006.01) | |
| C02F 1/04 | (2006.01) | |

(52) U.S. Cl.
CPC ............... *C02F 1/20* (2013.01); *C02F 1/441* (2013.01); *C02F 1/5272* (2013.01); *C02F 2101/101* (2013.01); *C02F 2101/105* (2013.01); *C02F 2101/38* (2013.01); *C02F 2301/08* (2013.01); *C02F 2303/04* (2013.01)

(56) References Cited

U.S. PATENT DOCUMENTS

| | | | |
|---|---|---|---|
| 8,915,301 B1 | 12/2014 | Bader | |
| 9,266,747 B1* | 2/2016 | Sparrow | C02F 1/04 |
| 9,539,522 B1* | 1/2017 | El-Sayed | C02F 1/06 |
| 9,701,558 B1 | 7/2017 | Bader | |
| 10,258,920 B1 | 4/2019 | Bader | |
| 10,259,734 B1* | 4/2019 | Bader | C02F 9/00 |
| 10,259,735 B1* | 4/2019 | Bader | C02F 1/06 |
| 10,280,103 B1 | 5/2019 | Bader | |
| 10,322,952 B1* | 6/2019 | Bader | B01D 1/305 |
| 10,336,638 B1 | 7/2019 | Bader | |
| 10,441,898 B1 | 10/2019 | Bader | |
| 10,450,202 B1 | 10/2019 | Bader | |
| 10,450,212 B1 | 10/2019 | Bader | |
| 10,557,269 B2* | 2/2020 | Warner | B29C 45/372 |
| 10,577,257 B1* | 3/2020 | Bader | C02F 1/042 |
| 10,577,269 B1 | 3/2020 | Bader | |
| 2017/0174532 A1* | 6/2017 | El Ayi | C02F 1/046 |
| 2019/0209943 A1* | 7/2019 | Efrat | C02F 1/042 |
| 2019/0240592 A1* | 8/2019 | Antar | C02F 1/12 |

OTHER PUBLICATIONS

Milhem, M.M. and Ahmed, K.N.; "Performance of a Pilot Cyclic Steam Stimulation Project in Kuwait"; SPE 15733, 1987.
Ahmed, K.N. and Milhem, M.M.; "Operation of a Second Steam Stimulation Pilot Project in Kuwait"; SPE 17987, 1989.

\* cited by examiner

MINIMIZING WASTES: METHODS FOR DE-TOXIFYING, DE-SCALING AND DISTILLING SOURCE WATER

RELATED APPLICATIONS

This application is a continuation-in-part of my pending patent application Ser. No. 16/873,135 filed on Feb. 8, 2020; which is a continuation-in-part of my patent application Ser. No. 16/501,510 filed on Apr. 16, 2019, now U.S. Pat. No. 10,577,269; which is a continuation-in-part of my patent application Ser. No. 15/731,999 filed on Sep. 7, 2017, now U.S. Pat. No. 10,322,952; which is a continuation-in-part of my patent application Ser. No. 15/731,626 filed on Jul. 10, 2017, now U.S. Pat. No. 10,336,638; which is a continuation-in-part of my patent application Ser. No. 13/999,309 filed on Feb. 8, 2014, now U.S. Pat. No. 9,701,558.

This application is also a continuation-in-part of my pending patent application Ser. No. 16/873,136 filed on Feb. 8, 2020; which is a continuation-in-part of my patent application Ser. No. 16/501,595 filed on May 6, 2019, now U.S. Pat. No. 10,577,257; which is a continuation-in-part of my patent application Ser. No. 14/998,774 filed on Feb. 13, 2016, now U.S. Pat. No. 10,280,103; which is a continuation-in-part of my patent application Ser. No. 14/544,436 filed on Jan. 6, 2015, now U.S. Pat. No. 10,259,735; which is a continuation-in-part of my patent application Ser. No. 14/544,317 filed on Dec. 22, 2014, now U.S. Pat. No. 10,259,734; which is a continuation-in-part of my patent application No. 13/066,841 filed on Apr. 26, 2011, now U.S. Pat. No. 8,915,301.

BACKGROUND OF THE INVENTION

For many years, a reverse osmosis (RO) reject stream from an unconventional wastewater treatment and reclamation plant (WWTRP) has been dumped into the sea. Health, aquatic life, and environmental protection considerations are of prime importance when it comes to the disposal of effluents from conventional wastewater treatment plants (WWTP) because they do not remove much of the toxicity and nutrients contained in sewage. With looming water shortages, reclamation of effluents has been revisited, attention has been given to hydrophilic membranes in eighties, and some has been implemented in late nineties. For a WWTRP, as may be depicted in FIG. 1, the removal of such species from effluents lies at the heart of the treatment. The side chains of about three-quarters of the amino acids comprise polar hydrophilic species, whereas the remaining quarter comprises hydrophobic species. Amphiphilic mixing of these seemingly non-mixable species is the key in steering the folding of proteins that mask endotoxins. The reclamation part of the unconventional WWTRP [e.g., ultrafiltration (UF) and RO hydrophilic membranes] is nothing but splitting the content in effluents; reducing it in their product streams but elevating it in their reject streams. This is why such hydrophilic membranes have not been accepted by many regulating agencies to reclaim effluents. The alarming levels of endotoxins in all outputs resulting from the treatment and/or reclamation of sewage pose long-term health and pollution risks [e.g., U.S. Pat. Nos. 10,450,202; 10,450,212; and 9,701,558].

An unconventional sandstone oil reservoir lies within a relatively short distance from a WWTRP. This reservoir is considerably very shallow; thereby with considerably low temperature and pressure, and lower viscosity. It has also higher oil saturation, porosity and permeability. With such unusual overall desirable characteristics in a single oil reservoir, which is unlike heavy or viscous oil deposits elsewhere in the world, this reservoir has every potential for effective oil recovery at a low entry cost. The latter; however, is very critical to unlock this potential due to the high sulfur content (>5 wt %), high total acid number (TAN>3 mg KOH/g) and lower API (~14° of oil. This oil has thus no referential market price, not so much because of the lower viscosity (API) as because of the high sulfur content. It is neither economically amenable for blending with lighter crude (would not reduce the sulfur content below 3 wt % without destroying the market value of lighter crude) nor desirable for conventional refining. Nevertheless, source water is needed to generate steam for the deeper and thicker part of the reservoir, and hot water (and/or other methods) for the shallower and thin part of the reservoir.

Of what is this oil reservoir needed, an opportunity has thus emerged. That if the WWTRP's RO reject stream is utilized, the lacking source water for viscous oil recovery will be provided. Not only will the viscous oil be recovered, all hopes of not dumping the WWTRP's RO reject stream into the sea would also be revived.

However, not only a portion of the WWTRP's RO reject stream will be treated, but it will also be treated by another redundant new treatment system. This new system comprises a clarification including adding a coagulant, a flocculent, lime (hardness) and soda ash (alkalinity); sludge filter press; ozonation; media filtration; ultraviolet (UV) radiation; UF; acidification; de-carbonation/de-aeration; adding more additives including a pH neutralizer, an oxygen scavenger and a scale inhibiter; a RO (or NF) main treatment; an ion exchanging (IE) treatment, and a RO polishing treatment [e.g., Water Online, Jan. 30, 2019; Water World, Feb. 4, 2019]The purpose of the treatment is to feed once-through steam generators (OTSGs), thereby producing steam for the viscous oil recovery.

The WWTRP originally produced about 2 million barrels per day (BPD) of the RO product stream, and then expanded to produce about 3.2 million BPD. Thus, the amount of the RO reject stream before expansion was about 0.35 million BPD, and about 0.6 million BPD [25.6 million U.S. gallons per day (GPD)] after expansion at a typical 84-85% RO recovery ratio [RO product flow rate/RO feed flow rate].

Phase I of the viscous oil recovery by steam is divided into two sub-phases. The first sub-phase (IA) essentially requires 100,000 BPD of feed water for OTSGs in the first 4 years to presumably produce about 33,000 barrels of heavy oil per day (BOPD). In the following 6 years (year 5 to 10), the extracted produced water with viscous oil will be used as source water for OTSG in the second sub-phase (IB). This is because the anticipated water cut in viscous oil may be in the order of about 0.77, the anticipated viscous oil production may be in the order of about 66,000 BOPD, and the required water to oil ratio by steam injection may be about 3.33. Thus, the anticipated amount of produced water (about 220,000 BPD), after separating it from viscous oil, may be sufficient for steam injection in the second sub-phase (IB). A mechanical vapor re-compression (MVR) system may then be the produced water treatment system in the second sub-phase (IB). FIG. 2 may depict such a possible MVR system.

That is to essentially say that the first sub-phase (IA) may be a temporary phase to initiate steam injection. The water source and the new system to essentially prepare 100,000 BPD of such water source to feed OTSGs in the first sub-phase (IA) are described above. The initial cost of this new water preparation system alone is about $1.222 billion, and contracted in Jan. 2015 [e.g., as referenced in the article of AlKaaoud, et al., SPE 189455, Aug. 2018 (Albawaba Online, "Worst Timing Ever? . . . $4.2 Billion of Heavy Oil Development Contracts", Jan. 11, 2015)]. This initial cost may be subjected to further increments by adjustment orders that usually follow. To date, viscous oil production by steam injection in Phase IA has been delayed [e.g., Petroleum Economist; Feb. 20, 2020].

Table 1 (e.g., average values) reveals that the only three parameters in the WWTRP's RO reject stream that do not meet the OTSGs' feed water specifications are the total hardness (TH), dissolved oxygen (DO) and pH. Yet, this elaborate system to treat a portion of the WWTRP's RO reject stream not only duplicates the reclamation part (UF and RO) of the WWTRP (FIG. 1), but it is also over redundant in itself. It includes three forms of disinfection (chlorination, ozonation, and UV); three forms of filtration (filter press, media filtration, and UF); three forms of total hardness removal (lime/soda ash, a RO or NF/scale inhibitor, and an IE); three forms of de-aeration (a vacuum de-aerator, an oxygen scavenger, and a nitrogen blanket/ steam driven de-aerator), and three forms of pH adjustment (lime/soda ash, acid, and a pH neutralizer). Actually, the triplicate forms of each type of treatment in this new system exceed the duplicate forms of each type of species in "Noah Ark". Interestingly, this new treatment system will produce a third form of waste; that is to say that waste from sewage is now tri-generated in triplicate forms. Earnestly, this new treatment system that will treat a portion of the WWTRP's RO reject stream will hereinafter be referred as the Triplicate-Wastewater Treatment & Reclamation Plant (T-WWTRP).

"Form ever follows function"; said "Louis Sullivan," the famed American architect. However, "function follows purpose". But do the functions of these treatment forms in the T-WWTRP serve the purpose economically and environmentally? Could the purpose be alternatively served by other economic and/or environmental routes?

The T-WWTRP: To Essentially Prepare 100,000 BPD for OTSGs

The long-known practice in the treatment of boiler feed water with extreme total hardness such as seawater, wherein calcium hardness is much lower than magnesium hardness, was to use soda ash to preferentially remove the total dissolved calcium present as carbonate (bicarbonate) and non-carbonate (sulfate) hardness by about 67-72% at ambient temperature, 78-85% at 60° C., and 90% with recycling a portion of the precipitated calcium carbonate as a seeding agent [e.g., Nalco Chemical Co., Boiler Feedwater Treatment, Bulletin 30, 1961]. The reactions may be simplified as follows:

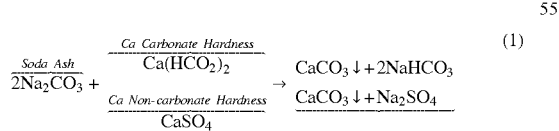

Since soda ash is expensive, one variation is to use lime for removing the portion of the dissolved calcium present as carbonate hardness followed by soda ash to remove the other dissolved calcium salt (non-carbonate hardness). Another variation is to use an excess amount of lime followed by soda ash and a phosphate source to near complete the removal of calcium along with partial removal of magnesium. A further trimmed variation is to use lime to remove the portion of the dissolved calcium present as carbonate hardness, and hasten the precipitation rate of calcium carbonate and remove the unreacted and/or undissolved amount of the added lime by soda ash.

However, these methods are of ages past not just because of the high operating cost and/or generation of excessive useless wet sludge, but also because the very purpose of removing calcium carbonate is immediately negated by the very function of the added additives. Lime contributes more calcium to the non-carbonate hardness, thereby removing the excess calcium resulting from the added lime by soda ash. Soda ash, in turn, contributes more carbonate to the total alkalinity, thereby removing the excess carbonate resulting from the added soda ash by combinations of acid, a vacuum de-carbonater/de-aerator, and then a pH neutralizer. Yet, these additives marginally decrease, if not increase, the total hardness; when the total hardness in feed water is either relatively low or high, or when an excess amount of lime is used to remove a substantial portion of magnesium hardness (carbonate and non-carbonate) since it simultaneously substantially increases the calcium non-carbonate hardness.

The reactions that take place for hydrated lime to remove carbonate hardness may be expressed as follows:

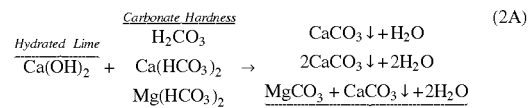

In Eq. (2A), carbonic acid does not contribute to the hardness, but it reacts with the hydrated lime, thereby utilizing some of the hydrated lime before the hydrated lime starts removing the calcium hardness. Theoretically, for each 1 mol of calcium ion removed, 2 mol of hydroxyl ion from the hydrated lime is required. Thus, for each 1 mol of calcium carbonate hardness removed, 2 mole of calcium carbonate sludge is produced. The produced magnesium carbonate in Eq. (2A) is relatively soluble, which requires more hydrated lime to remove it:

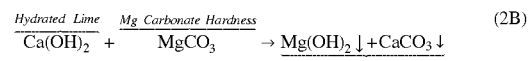

A further amount of hydrated lime also removes the magnesium non-carbonate hardness:

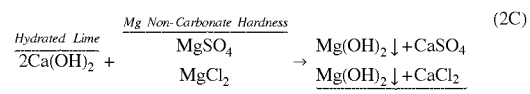

Eqs. (2A) through (2C) indicate that for each 1 mol of magnesium hardness, 4 mol of hydroxyl ion from the hydrated lime is required. Thus, for each 1 mol of magnesium hardness removed, 1 mole of magnesium hydroxide and 2 mole of calcium carbonate sludge are produced. It follows that the water now contains the original calcium non-carbonate hardness, and the calcium non-carbonate hardness produced in Eq. (2C). Soda ash can be added to remove the calcium non-carbonate hardness:

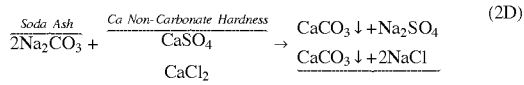

(2D)

The required amount of soda ash (0.94 mol) is nearly stochiometrically equal to the sum (1 mol) of the calcium carbonate and calcium non-carbonate hardness (TH) plus the produced calcium non-carbonate hardness [Eq. (2C); if applied]. Because calcium carbonate tends to supersaturate without an excess of soda ash, about 12% excess of soda ash may be required.

A WWTRP's RO reject stream been tested by the inventor using hydrated lime and soda ash. Table 1 presents the nature of the tested RO reject stream and FIG. 3A illustrates the results. To reach a pH level that allows near complete precipitation of magnesium hydroxide, the hydrated lime dose is fixed at 775 mg/L, which is calculated (in terms of meq./L) as follows:

$$Ca\alpha(OH)_2 = H_2CO3 + HCO3 + Mg + 4 \qquad (2E)$$

However, at a pH of about 10.6-10.8 whereby magnesium hydroxide starts precipitating, the required hydrated lime is about 675 mg/L (about 0.87 of the hydrated lime dose).

FIG. 3A indicates that the total hardness in the tested RO reject stream is reduced by 18% and 10% at, respectively, stochiometric fractions of about ⅓ and 1.0 of the fixed hydrated lime dose (775 mg/L). The calcium hardness decreases by about 28% at about ⅓ of the fixed hydrated lime dose (775 mg/L) but substantially increases by 130% at the full dose of the fixed hydrated lime. In other words, the calcium hardness at the full dose of the fixed hydrated lime, as the only additive, is higher than the original calcium hardness in the tested WWTRP's RO reject stream. The magnesium hardness marginally increases by about 3% at about ⅓ of the fixed hydrated lime dose (775 mg/L) but expectedly decreases by about 96% at the full dose of the fixed hydrated lime. Since the original magnesium hardness is about ⅓ of the total hardness, the higher removal of the magnesium hardness at the full dose of the fixed hydrated lime offsets the substantial increase in the calcium hardness at the same dose. When soda ash in the amount of 1,110 mg/L is added in a combination with the full dose of the fixed hydrated lime (775 mg/L), about 93% of TH is removed. The pH is dropped to 10.3, since the added soda ash produces calcium carbonate, thereby consuming hydroxyl ions. The concentration of sulfate essentially remains the same, whether hydrated lime is used alone or in a combination with soda ash.

A precipitation method may be of a useful utility if the cost of additives is low and/or the value of the precipitating compounds is high. Neither soda ash is inexpensive, nor do the precipitating compounds bear any value (a non-selective useless mixture of calcium carbonate, calcium phosphate, magnesium hydroxide and transition metals laced with extreme toxicity).

It is the nature of domestic wastewater treatment to fluctuate in terms of species content (Table 1). Such fluctuations may be within an expected average range, but some may be unexplainable abnormal outliers. For example, the TH of the extreme outlier (Table 1) is relatively high, which requires 1,100 mg/L of fixed hydrated lime dose and 2,800 mg/L of soda ash in order to reduce the TH by about 90%.

To reduce the cost of additives and minimize the generation of excessive toxic wet sludge, and since the hydrated lime/soda ash is the first main step in the three main steps (RO or NF as a second main step followed by ion exchanging as a third main step) of the T-WWTRP, this first main step is essentially used for marginally reducing TH in order to improve the recovery ratio of RO or NF (the second main step). Thus, calcium carbonate hardness is partially marginally removed by treating a WWTRP's RO reject stream with a sufficient amount of hydrated lime to convert dissolved carbonates (carbonic acid and bicarbonate) to calcium carbonate. For a design purpose entailing normal average species content as well as abnormal species content, the amount hydrated lime dose may be taken within about 0.5 of the fixed hydrated lime dose (1,100 mg/L) when species content in the RO reject stream is at an abnormal level, which would remove about 20% of the TH. This amount of hydrated lime coincides with about 0.7 of the fixed hydrated lime does (775 mg/L) when the species content in the WWTRP's RO reject stream is at a normal average level. This would limit the amount of soda ash for essentially removing the unreacted and/or undissolved amount of calcium resulting from the addition of hydrated lime, hasten the precipitation of calcium carbonate, and slightly increase the pH. This reaction may be expressed as follows:

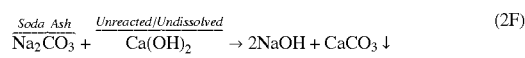

(2F)

In consequence, calcium in a treated WWTRP's RO reject stream resulting from the first main step (hydrated lime/soda ash) of the T-WWTRP may be reduced by about 10-20%. This may result in losing about 5% of the water content and producing about 23,000 tons per year of toxic wet sludge to be hauled away (roughly about 1,400 semi truck loads of sludge per year). This, in turn, (after ozonating, media filtering, UV radiating, filtering by UF, acidifying, de-carbonating/de-aerating, pH neutralizing, oxygen scavenging, and scaling inhibiting) limits the recovery ratio of the followed RO to about 50% or NF to about 70%. The recovery ratio of either RO or NF, as the second main step in the T-WWTRP, is controlled by the saturation limit of calcium sulfate dihydrate (gypsum). The tradeoff between using RO or NF as the second main step is summarized as follows. RO rejects all ions nearly equally; thereby the high removal of calcium and magnesium is useful in reducing their loads on the following IE (the third main step). The high removal of calcium and sulfate imposes a limit on their concentrations in the RO reject steam; thereby the RO recovery ratio may be confined to about 50%, where calcium and sulfate concentration in the reject stream are nearly doubled. NF allows most monovalent ions (sodium, potassium and chloride) to pass through; but partially rejects monovalent bicarbonate and divalent cations (magnesium and calcium), and highly rejects the divalent sulfate. The partial removal of calcium and high removal of sulfate allow a higher NF recovery ratio compared to RO, which may be limited to about 70%, wherein the sulfate concentration in the NF reject stream may be about 3.3-times higher than its concentration in the NF feed stream. RO for sulfate removal would be considered only when monovalent ions and divalent cations must also be removed since the RO reject stream would be about 50%. NF costs less for effective sulfate removal than RO when the removal of monovalent ions is not necessary and near complete removal of divalent cations is not a must since NF operates at a slightly lower pressure and a higher recovery ratio (reject stream about 30%) than RO. As such, about 55% of the WWTRP's RO reject stream that feeds the T-WWTRP will be lost as liquid waste if RO is used as the second main step along with the lime/soda ash as the main first step; or about 35% if NF is used instead as the second main step. Since the T-WWTRP comprises a multitude of filtration, regeneration and disposal steps; all of which require significant amounts of quality water (backwashing, regenerating ion exchanging resins, buffering disposal wells, etc.), the thereby further RO polishing step may be mostly dedicated to produce such water for such extra utilities. Thus, a further amount in the order of about 40,000-50,000 BPD may be needed, in addition to the actually required 100,000 BPD to feed OTSGs.

FIG. 3B illustrates the waste paths of the T-WWTRP to treat a portion of the WWTRP's RO reject stream. About ½ to ⅔ of the WWTRP's RO reject stream will continue be dumped into the sea, and about ⅓ to ½ of the WWTRP's RO reject stream will be treated by the T-WWTRP, where the latter will reject about ⅓ to ½ of its feed into aquifer waters (disposal wells) and settling ponds. The toxicity of the entire WWTRP's RO reject stream will now be distributed among the sea, aquifer waters and landfills. The latter could also be an indirect path to contaminate shallow groundwater and brackish water. This partial solution for the disposal of WWTRP's RO reject stream problem has now created several new ones. Neither dilution in seawater (the WWTRP's RO reject stream) nor dilution by expanding distributions in seawater (the WWTRP's RO reject stream), aquifer waters and settling ponds (T-WWTRP) is a solution to toxic pollution.

Alternative Economic and/or Environmental Routes

One immediately available option for the temporarily first sub-phase (IA) and beyond is using 3% of the RO product stream from the WWTRP [100,000 BPD, and may be little more for other minor utilities such as washing/de-salting recovered oil and seal flush, out of about 3.2 million BPD) to feed OTSGs. The full cost ($0.10325/barrel) of 100,000 BPD of purchasing the WWTRP's RO product stream in the entire 4 years, for example, would be about $15.1 million, whereas the purchasing cost at the subsidized rate (discounted by 76.3%) would be about $3.6 million. This full cost of purchasing 100,000 BPD of the WWTRP's RO product stream is 67-fold less than the initial cost (about 1.2% of the initial cost) of the T-WWTRP to prepare 100,000 BPD from the WWTRP's RO reject stream to feed OTSGs; excluding further adjustment orders and operating costs of the T-WWTRP. This WWTRP's RO product stream is more suited for "Direct Non-Potable Uses" (e.g., boilers or cooling towers) than "Non-Direct Potable Uses" (e.g., irrigation and/or augmentation of aquifer waters). In fact, about 68,000 BPD of this WWTRP's RO product stream is donated in late 2015 to a university to feed once-through cooling towers of the university's air conditioning system. Some of this WWTRP's RO product stream is also diverted to artificial lakes in Wildlife Protected Areas, a scientific club, a hunting club, and the like. Some farmers, the main designated end users of this WWTRP's RO product stream, may refrain from using it because of potential toxicity (transferring via food chain supplies), low TDS (clogging soil pores), and low SAR (no value to crops) even though it is provided to them at a substantially subsidized rate. If this 3% (or so) of the WWTRP's RO product stream that costs 1.2% of the initial cost of the T-WWTRP to prepare 100,000 BPD from the WWTRP's RO reject stream was utilized, the viscous oil recovery project would have been implemented 10 years ago or so when referential prices of crude oil were at their peaks and the real market price for a barrel of heavy oil with lower sulfur content (<3 wt %) was within $20 [e.g., SPE 127477; 2009]; not delayed to this day when the barrel of this heavy oil does not have an intrinsic commercial value in itself, yet the estimated cost of producing it may be in the order of $57.

Another immediately available option for the first sub-phase (IA) and beyond is using a portion of an effluent stream from any nearby conventional wastewater treatment plant (WWTP) or a portion of the effluent stream from the WWTRP and treat it by an ion exchange system with a closed regeneration cycle. The cost ($0.06/barrel) of purchasing 100,000 BPD of the effluent stream in the entire 4 years, for example, would be about $8.8 million, whereas the purchasing cost at the subsidized rate (discounted by 80%) would be about $1.8 million. The cost of a conventional ion exchange system to treat 100,000 BPD of an effluent stream would be in the order of about $4 million. The ion exchange system is essentially nothing but fiber glass tanks, pumps and valves; thereby it can be assembled in-house. The salinity in terms of total dissolved solids (TDS) of an effluent stream from a conventional WWTP or a WWTRP is (Table 1) within the salinity of potable water, and the total hardness and sulfate are low; all of which allow effective removal of total hardness by an ion exchange system using sodium chloride as soft brine (the cheapest additive) to regenerate the resin in a closed cycle. In fact, calcium and magnesium concentrations in the effluent stream (Table 1, ES-A) are about 3-times less than their correspondent concentrations in the NF product stream (Table 2, NF-PS), if NF will be used as the second main treatment step prior to the ion exchange in the T-WWTRP [based on the inventor's testing of a WWTRP's RO reject stream (Table 1, RORS-T). Because the volume of the regeneration stream (e.g., sodium chloride soft brine) is very small and the effluent stream may be toxic, the closed regeneration cycle may comprise the steps of, for example, using soda ash [Eq. (1)] to remove calcium hardness (the only calcium hardness) followed by sodium hydroxide (instead of lime) to remove magnesium hardness from the spent sodium chloride brine, and a vacuum filter to convert precipitates to dry cake. The dry cake can be transferred safely to a designated Class II landfill. The sodium chloride soft brine can be neutralized by hydrochloric acid and recycled continuously to regenerate exhausted ion exchange resins, instead of rejecting it into disposal wells and/or settling ponds. Applying the original soda ash treatment to this very small volume of the IE reject brine is by far cheaper than applying it to the WWTRP's RO reject stream as a first main treatment step. It also eliminates the entire excessive waste generation situations and their ramifications as may be depicted in FIG. 3B; thereby eliminating their logistic and environmental burdens.

A further option is financing an entire power-seawater co-generation plant with an investment equivalent or far less the initial cost of the T-WWTRP to prepare 100,000 BPD from the WWTRP's RO reject stream to feed OTSGs. Nearly within the time frame of signing the contract of Phase IA of the steam injection project, a contract was also signed in 2014 for a complete power-seawater co-generation plant [may be referred as an Independent Water and Power Plant (IWPP)]. The power co-plant of this IWPP produces about 1,500 MW, the seawater desalination co-plant produces about 130 million GPD (3.1 million BPD) of distilled water, and the IWPP is put into service in Sep. 2016. The total cost of this IWPP is $1.4 billion; out of which $437 million for the seawater desalination co-plant, which comprises 10 desalination trains and each produces about 13 million GPD (310,000 BPD). 60% of the total cost of the IWPP is provided by a governing entity and the rest by a consortium of private investors. The 40% share by the private investors gives them, in turn, the right to sell the produced power and water to the governing entity at a pre-determined price for forty years. Yet, strangely, the required fuel to power the IWPP is supplied to the private investors for free. It should obviously alternatively make sense, instead of spending $1.222 billion as the initial cost of the T-WWTRP, to: (1) invest $560 million (the 40% share of the private investors in the IWPP), if not entirely owning the IWPP or building a similar plant in a location closers to the viscous oil reservoir; (2) use only one-third of the produced distilled water from only one desalination train (3.2% of the total distilled water production of the entire desalination co-plant) for the steam injection project; and (3) sell or donate the rest of the produced distilled water along with the produced power to the governing entity. It is the oil company, after all, that provides the fuel to the private investors of the IWPP for free; owns the viscous oil reservoir; and spends $1.222 billion as the initial cost of the T-WWTRP to prepare 100,000 BPD of feed water to produce steam in hope for producing 33,000 BOPD of viscous oil in Phase IA. This imaginative investment can be extended a little further to: (1) use only two-thirds of the produced distilled water from only one desalination train (or the entire production of one desalination train for that matter) for it is steam injection project in Phase IB and beyond because the power requirement for a MVR system (e.g., FIG. 2) may be about 900 MWh (which is about 60% of the produced 1500 MW from the IWPP) to treat 220,000 BPD of produced water; or at least (2) divert 900 MWh from the IWPP to power the possible MVR system. If the T-WWTRP that that essentially prepares 100,000 BPD from the WWTRP's RO reject stream costs at least $1.222 billion costs to feed OTSGs in Phase IA, the cost of the possible MVR system to treat 220,000 BPD of produced water in Phase IB will be much higher.

Yet, a further option is treating the entire WWTRP's RO reject stream at its source to safe guard the public health, aquatic life and environment. The RO reject stream, as the WWTRP originally contracted, should be treated by a zero-liquid discharge (ZLD) brine evaporator, but it should not dumped into the sea. The cost of the brine evaporator was then about $50 million, but it has never been implemented; thereby dumping of WWTRP's RO reject stream into the sea continues to this day. On the other hand, drinking water comes only from seawater desalination plants. Seawater is therefore the source water for desalination plants, and the dumping of WWTRP's RO reject stream is an indirect path for endotoxins to drinking water, let alone eutrophication and persistence death of aquatic life. Endotoxins are notoriously resistant to destruction by heat (stable at 120° C., which is higher than the top brine temperature of any existing desalination plant) and various disinfection methods including chlorine. Health standards are absolutely correlated with water quality. There cannot be any danger to public health, even if they were enough oil resources to produce wealth, to satisfy an energy supply situation, or to meet an oil production target, unless there is intrinsic water quality. If the $1.222 billion initial cost of the T-WWTRP in Phase IA was imaginatively added to the cost of the anticipated MVR system to treat 220,000 BPD of produced water in Phase IB, and their combined cost was, instead, fully dedicated to build the brine evaporator that supposed to cost $50 million in the early 2000s to treat the entire WWTRP's RO reject stream, it would at least serve a far greater purpose (protecting public health) in addition to the steam injection project in Phase IA, Phase IB, and beyond. But even if exponential spending was not an issue, the counter obvious problem would be the power requirement for a MVR system to treat about 600,000 BPD (the entire WWTRP's RO reject stream), which may be about 2,400 MWh (about 60% more than the produced power from the IWPP). An example of such an energy-intensive brine evaporator was presented by Walcott and Gorgol [1988].

THE OBJECTIVES OF THE INVENTION

Any pattern with an essential notion that does not economically and environmentally distinguish between means (by which an entity is seeking to get there) and ends (for which an entity is striving) cannot match any real situation. The same goes for any pattern with an essential notion that does not diagnose with a bird's-eye perspective before prescribing. Neither pattern is sustainable for a long period because either one is entirely wrong at the start. Of concern here; however, are the environmental burdens and the long term effects on public health and aquatic life.

The definite chief objective is thus treating the WWTRP's RO reject stream in its entirety, instead of dumping such a toxic waste stream into seawater, as a duty not a commercial noise, since we owe it to a public that it is sole source of drinking water comes from desalinating the seawater.

The second objective is to effectively treat produced water resulting from viscous oil recovery.

The third objective is to effectively treat the liquid waste streams resulting from the T-WWTRP (e.g., FIG. 3B), and along with produced water resulting from viscous oil recovery.

BRIEF SUMMARY OF THE INVENTION

Dumping a WWTRP's RO reject stream into the sea directly destroys aquatic life and indirectly affects public health. This invention is triggered by solving the problem at where it starts. One embodiment begins with utilizing two types of waste; one is the WWTRP's RO reject stream in its entirety, and the other is letdown steam from OTSGs or steam from a standalone OTSG fueled by sour gas resulting from viscous oil recovery by steam injection. It ends with thermally sterilizing toxicity and isolating it by the alkalinity content of the WWTRP's RO reject stream itself, combating sulfate scale and recovering it as a useful product, and producing distillate for viscous oil recovery by steam injection and de-scaled brine for improved oil recovery by water or hot water flooding. The vehicle to attain this set of objectives is an inventive RB-MSF train with two modified flashing stages. FIG. 4 summarizes this embodiment.

Another embodiment begins with utilizing two types of waste; one is a co-produced water with viscous oil by steam injection, whereas the other is letdown steam from OTSGs or steam from a standalone OTSG fueled by sour gas from heavy oil recovery by steam injection. It ends with combating calcium hardness and magnesium hardness recovering them also as useful products, and producing distillate for viscous oil recovery by steam injection and de-scaled brine for improved oil recovery by water or hot water flooding. The vehicle to attain this set of objectives is an inventive RB-MSF train with two modified flashing stages.

A further embodiment begins with utilizing two types of waste; one is liquid waste streams comprising produced water, a reject stream from a RO or NF main treatment unit, and an ion exchange displaced reject brine, whereas the other is letdown steam from OTSGs or steam from a standalone OTSG fueled by sour gas from heavy oil recovery by steam injection. It ends with combating carbonate scale recovering it also as a useful product, combating sulfate scale and recovering it as a useful product, and producing distillate for heavy oil recovery by steam injection and de-scaled brine for improved oil recovery by water flooding. The vehicle to attain this set of objectives is an inventive RB-MSF train with two modified flashing stages.

The inventive methods are not restricted to use in connection with one particular application. They can be used, in general, to treat any feed stream, to de-toxify and/or de-scale the feed stream, and to produce distillate and de-scaled brine. Further objects, novel features, and advantages of the subject invention will be apparent to those skilled in the art upon examining the accompanying drawings and upon reading the following description of the preferred embodiments, or may be learned by practice of the invention. Those of ordinary skills in the art will appreciate that the subject invention can be modified or adapted in a variety of ways. All such modifications or adaptions, which fall within the scope of the appended claims, are intended to be covered.

DESCRIPTION OF THE PREFERRED EMBODIMENT

Figure 1:
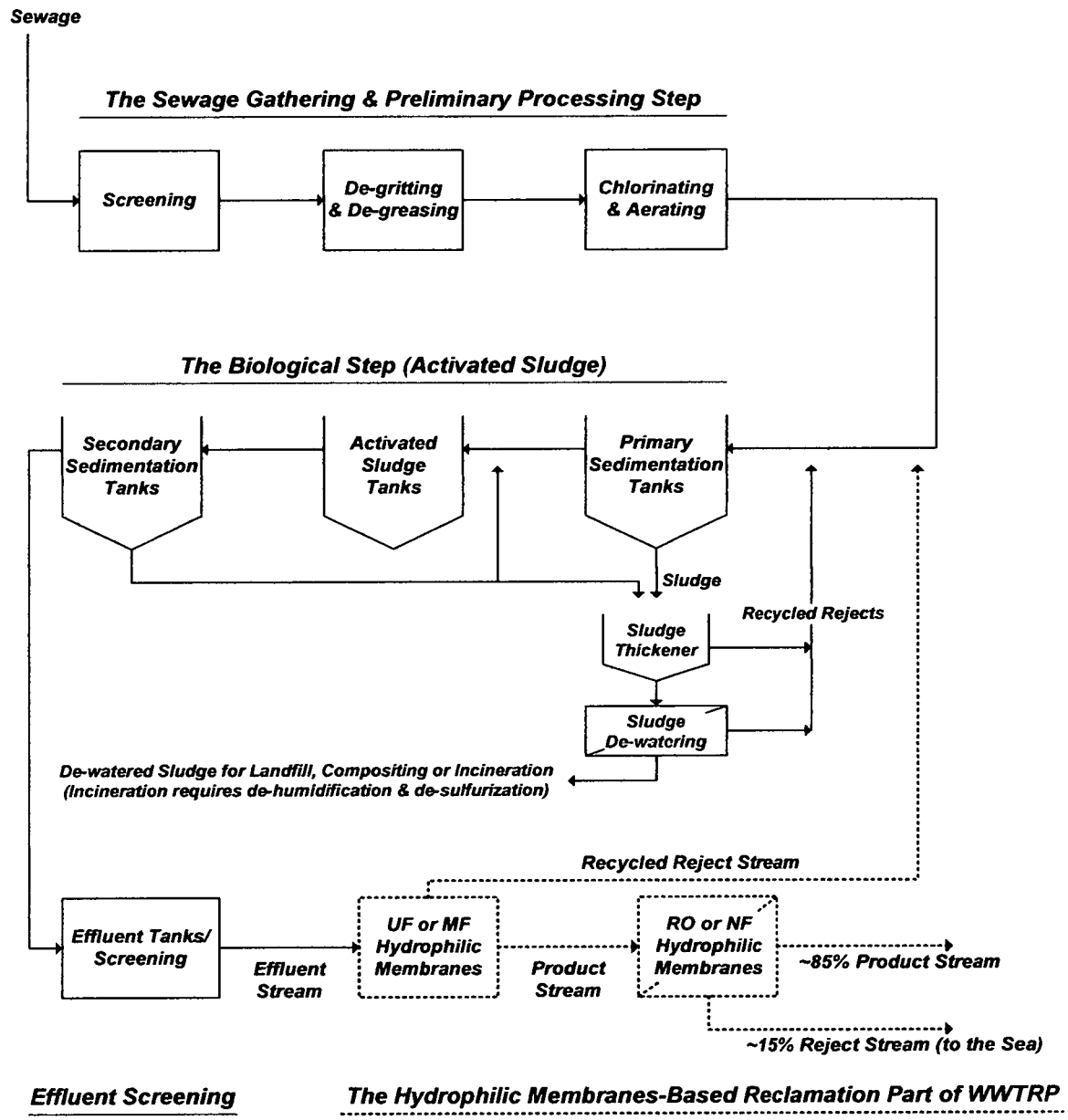
FIG. 1 illustrates a possible flow sheet for a WWTRP.

Alternative non-thermal methods to treat a WWTRP's RO reject stream and the like have been patented [e.g., U.S. Pat. Nos. 10,450,202; 10,450,212; and 9,701,558]. These methods are very effective in terms of: (1) de-folding the amphiphilic nature of proteins in the waste stream to ultimately separate endotoxins with carbon dioxide as dense gas; (2) de-scaling the de-toxified wastewater stream, where the products of the de-scaling step are commercially viable; and (3) substantially reducing capital and operating costs.

The Waste Thermal Generation

However, this invention innovatively takes advantage of the fired heaters (OTSGs) that typically generate wet steam with about 80% quality at a pressure and temperature above 100 bar and 300° C., respectively. Other levels of steam quality may also be selected anywhere below 80% and as low as about 20%. In some types of heavy oil recovery such as the intermittent Cyclic Steam Stimulation (CSS) followed by continuous wet steam flooding and/or hot water, the entire steam from OTSGs is injected into a reservoir. CSS is typically applied when oil deposits are at depths much greater than 400 meters. As such, generated steam from OTSGs in such applications is typically subjected to multiple thermal degradations and letdowns depending on the fracture pressure of a reservoir (e.g., typically far less than 100 bar within the applicable depth for steam injection), the depth of oil deposits, and the travel distance of wet stream from OTSGs to injection wells. In other types of heavy oil recovery such as the Steam Assisted Gravity Drainage (SAGD), wet steam from OTSGs is flashed in a single-stage or multi-stage steam separator(s) to essentially generate 100% dry saturated steam and letdown wet steam. SAGD is typically practiced when oil deposits are at depths of about 100 to 400 meters. Depending on the reservoir's characteristics, the depth of oil deposits and oil viscosity, either type of the flashed steam or both may be used for viscous and heavy oil recovery. As such, the waste thermal generation from both types of viscous and heavy oil recovery lends itself for optimum utilities, wherefore a thermally-driven desalination system can make use of it.

The simplified first cyclic steam pilot design that extended from 1982 to 1986 [SPE 15733, 1987] and the followed second steam pilot [SPE 17987, 1989] for the described reservoir in Paragraph [0004] preliminary concluded that oil can be extracted by reducing its viscosity by over 10-fold at a temperature of about 150° C. Lower viscosity and higher saturation oil has been accumulated at a low temperature and pressure due to an overall very shallow depth. The depth gradient of the reservoir trends from the shallower southwest side of the reservoir (a depth of about 75 meters) toward the slightly deeper north east side (a depth of about 244 meters). Formation water overlies the oil bearing deposits and the salinity gradient trends with depth from nearly fresh to brackish water at the shallowest depth to a higher salinity (about seawater level and above) toward the deeper side of the reservoir (Table 2). In these two pilots, steam was generated at about 37.9 bar (below the formation fracture pressure), and injected at a depth of about 128 meters and at pressures within the well head pressures (about 26.9-29.9 bar). This suggests that the generation of 80% quality steam at a pressure of about 130 bar and a temperature of about 330° C. from OTSGs in Phase IA and beyond will be thermally degraded through the travel distance from the OTSGs to wells and/or by the requirement of not exceeding the formation fracture pressure (37.9 bar). By not wasting such thermal energy, but rather using it in an effective thermal absorbing desalination system without discounting the required amount of steam, the entire WWTRP's RO reject stream can be treated (as well as produced water, rejects streams from the T-WWTRP, and/or combinations thereof), the load factor of OTSGs may also be improved, and so the economic and environmental positions are assisted.

Here, it is worth noting the following statements. "The pilot project was initiated with simplest design and was handled with in-house expertise with minimum input from outside consultants, . . . " [SPE 15733, pg. 361]. "Production of heavy oil in a place where high quality oil is abundantly available naturally takes a lower priority. However keeping the future requirements in view a modest start . . . " [SPE 17987; pg. 623]. These statements indicated that emphasis was placed on strategic planning rooted in an underlying economic objective. The means in both pilots started from both ends (between about 1,250 BPD and less of ground water or brackish water that essentially came from same formation water that overlies the oil deposit, and an OTSG operated below the fracture pressure of the oil reservoir) to converge in the middle, which was like building an economic bridge. Instead of being driven by consultants, they shaped their pilots to suit their future purposes and produced about 223,000 barrels of oil from 4 wells while they were at it. Now, by contrast, both ends critically diverge, and their high costs and environmental burdens are determinants. Exponential spending, when it can be clearly avoided, attracts others into the fray. Consultants are, of course, the first to gravitate toward it. One recent suggestion is mining the very shallow part of the reservoir to presumably avoid the risk of fracturing shale caprock by continuous steam flooding, even though steam injection in Phase IA in the deeper part of the reservoir has not been started. This will entail draining the shallow low salinity groundwater and brackish water (e.g., Table 2) before excavating the overburden; even though oil deposits is viscous (not even heavier) liquid associated with some gas; not solid bitumen. This will also entail diverting the drained water for dust suppression, re-injection in disposal wells, irrigation or evaporation in open pits. Yet, this water that ought to be drained in order excavate the shallow part of the reservoir is essentially the same water that was used in both pilots to generate steam [SPE 15733; SPE 17987]. If such water can be entirely drained and wasted to suppress dust, it should instead be treated to generate steam (as simplified in the preceding pilots), wet steam, hot water, alkaline water, among other utilities, for the entire reservoir without building the T-WWTRP and without thinking about excavating the shallow part of the reservoir.

Figure 2:
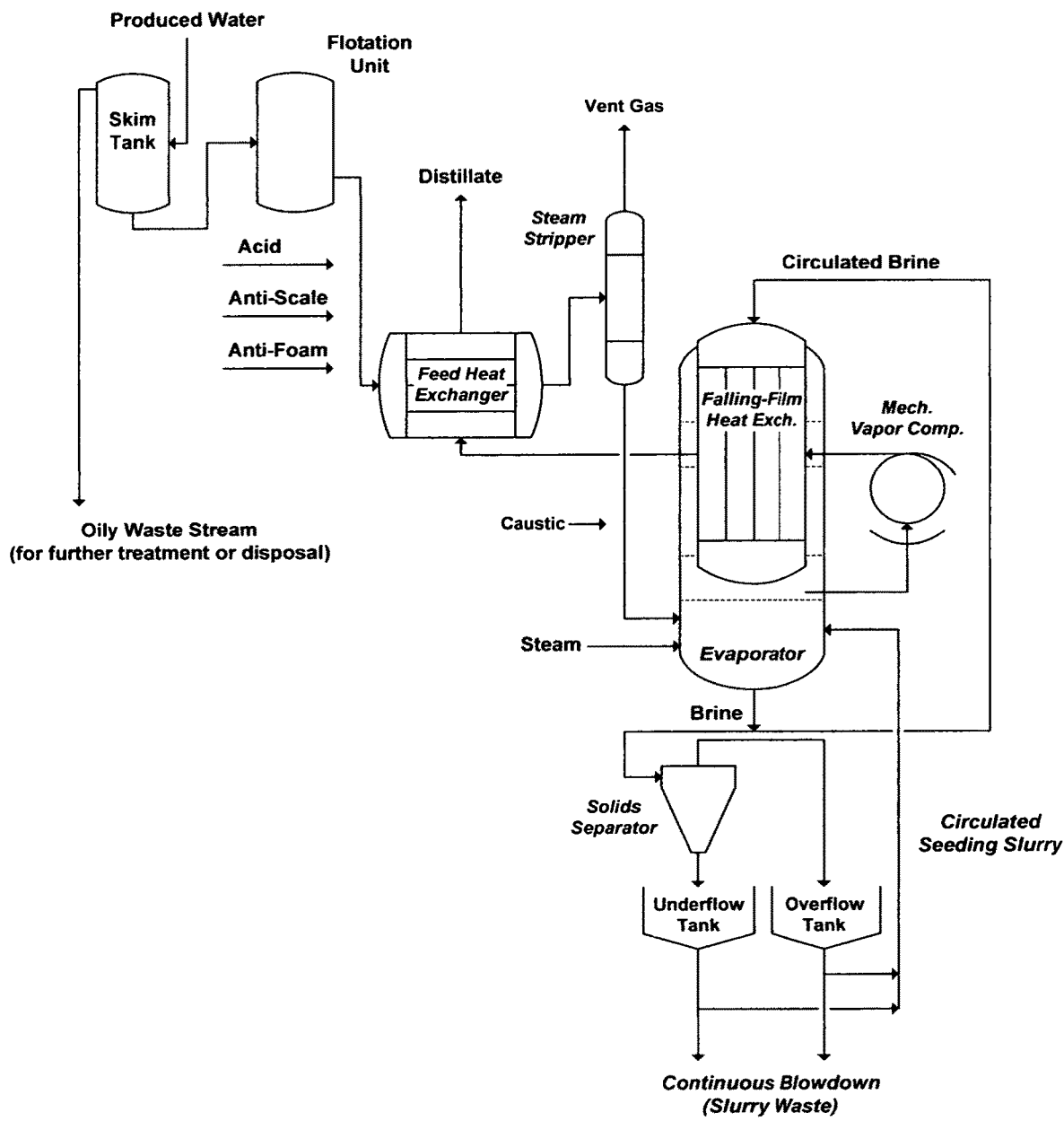
FIG. 2 illustrates a possible flow diagram or a vapor-recompression system (MVR) to treat produced water.

The waste thermal generation of OTSGs can be, of course, routed to the inlet of a MVR system (e.g., through the evaporator body and/or the heat exchanger for recycling as may be shown in FIG. 2). But it must be degraded further since the MVR system essentially operates at about atmospheric pressure. Yet, it will not reduce the intensive power requirement for the vapor compressor as pointed out specifically in Paragraph [0026] of this invention and thoroughly in U.S. Pat. No. 10,577,269 regardless of the nature of source water, even if any type of scaling issues, as also pointed in U.S. Pat. No. 10,441,898, is resolved.

In this invention, the waste thermal generation of OTSGs is rather routed to a brine heater of a single recycle-brine multi-stage flash (RB-MSF) desalination train, without a heat rejection section, and with the aid of two de-toxifying and/or de-scaling stages, to treat the entire WWTRP's RO reject stream and the like. By integrating the brine heater as a "heating condenser", the RB-MSF train can be part of the OTSGs steam generation cycle with some modification, wherein at least the train does not require the use of fuel at its full cost. By eliminating the heat rejection section, the requirement for cooling water and an external condenser [as is the case in multi-effect distillation (MED) and membrane distillation (MD), even though it is manageable] is also eliminated. By adding the de-toxifying and/or de-scaling stages, the conventionally imposed restrictions on the performance ratio, circulation ratio, and concentration ratio are all also lifted. An ultimate design freedom is thus obtained to select the desired amounts of distillate and de-scaled reject brine of the RB-MSF train, where both streams are much needed in enhanced (e.g., steam requires distillate) and improved (e.g., water or hot water flooding and its related methods require de-scaled brine) oil recovery. But above all, yet once and for all, the treatment of the WWTRP's RO reject stream in its entirety, for example, can be achieved in cost effective and environmentally sound manners.

The Waste Water Generation—A WWTRP's RO Reject Stream

Figure 5:
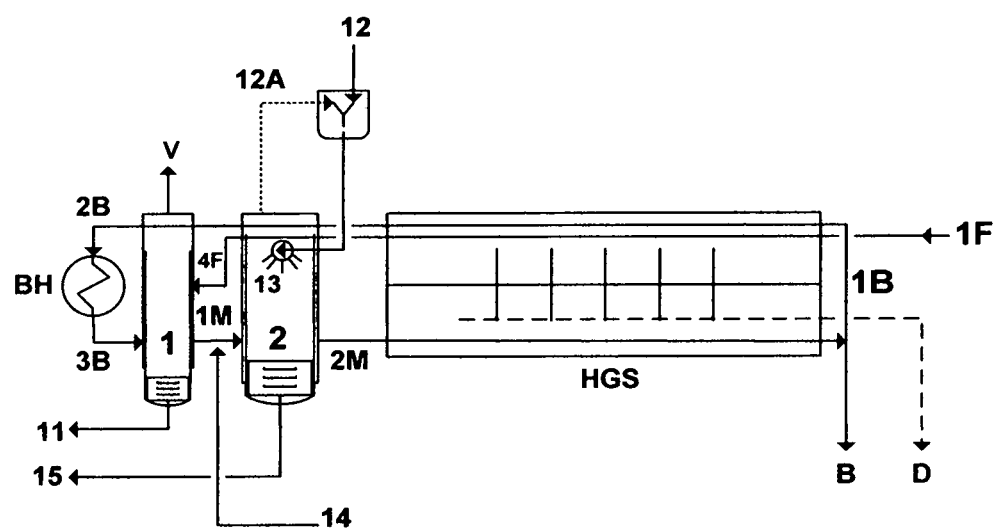
FIG. 5 illustrates a possible flow diagram for the inventive RB-MSF train.

The inventive RB-MSF desalination train is depicted in FIG. 5. The train comprises a brine heater [BH], two modified flashing stages ([1] and [2]), and a heat gain (recovery) section [HGS]. The heat gain section [HGS] comprises a plurality of flashing stages arranged in series. The RB-MSF train produces a distillate stream [D] and a de-scaled reject brine stream [B]. The feed stream (e.g., a WWTRP's RO reject) [1F] enters separately through inner tubes of a first set of pre-heaters, which passes through the entire flashing stages of the heat gain section [HGS] and a second modified flashing stage [2], thereby producing a pre-heated feed stream [4F] at the exit of the second modified flashing stage [2]. At least a portion [1B] of the de-scaled reject brine stream [B] enters separately through inner tubes of a second set of pre-heaters, which passes, in series, through the entire flashing stages of the heat gain section [HGS], the second modified flashing stage [2], and a first modified flashing stage [1], before it [2B] passes through the brine heater [BH] to gain further heat, thereby producing a heated brine stream [3B].

The pre-heated feed stream [2F] from the second modified flashing stage [2] flows into the first modified flashing stage [1], where it is mixed with the heated brine stream [3B], thereby it is thoroughly de-carbonated, de-gassed and sterilized by the vapor flashed from the heated brine stream [3B] to produce a first heated mixed brine stream [1M] (refers to it thereafter as a first mixed brine stream for simplicity). This is one of the key innovative steps in conducting the RB-MSF train, without adding any type of additives to the feed stream, but slightly letting down thermal energy from OTSGs by passing it through the brine heater [BH], and designing the inventive first modified flashing stage. Bicarbonate concentration in the WWTRP's RO reject stream (Table 1) is over 3-fold higher than that in seawater. When the feed stream [1] is adequately pressurized through the first set of pre-heaters higher than that corresponding to its saturation temperature, the alkaline scales would not precipitate [referring to Eq. (3a) of U.S. Pat. No. 10,577,269; the equilibrium would shift to the left in Eq. (3a)] as long as dissolved carbon dioxide is prevented from escaping the feed water being pre-heated and the amount of carbon dioxide is sufficient to exert adequate partial pressure. Any carbon dioxide that may evolve from the feed water being pre-heated within the first set of pre-heaters will be re-dissolved by the partial pressure of carbon dioxide itself. When the pre-heated feed stream [4F] enters the free space of the first modified flashing stage [1] (at lower pressure), carbon dioxide vigorously evolves from bicarbonate breakdown, the pH increases, and the thereby forming carbonate ions precipitate as calcium carbonate. Calcium phosphate and some magnesium carbonate also precipitate with calcium carbonate. At a temperature preferably above 120° C. in the first flashing stage [1], bacteria are also sterilized, thereby de-toxifying endotoxins to precipitate with their hosting proteins. Such precipitates [11] are removed from the bottom of the first modified flashing stage [1]. Carbon dioxide (along with oxygen) [V] is released from the top of the first modified flashing stage [1]. If necessary, a portion of released carbon dioxide [V] may be re-introduced into the feed stream in the first set of pre-heaters.

Yet, this key first modified flashing stage [1] has also the advantage of preventing venting problems in the brine heater [BH] since only the pre-heated brine stream [2B] (which is a recycle portion [1B] of the de-scaled brine reject stream [B], where the latter is already thoroughly de-gassed as it exits the heat gain section [HGS]) passes through the brine heater [BH]; whereas the pre-heated feed stream [2F] that requires venting prior to flashing in the heat gain section [HGS], flows separately into the first modified flashing stage [1]. This would also eliminate the need for a vacuum de-aerator to partially de-carbonate the feed upstream of the heat gain section, and an oxygen scavenger to further de-aerate the feed before it enters the heat gain section stream. This would further substantially reduce, if not eliminate, the consumption of medium pressure (MP) steam in ejectors to vent the flashing stages within the heat gain section; wherein this venting, in turn, causes scale build up (if the feed is not de-scaled prior to flashing in the heat gain section) and loss of water vapor (distillate) via venting. The importance of these additional advantages can be more appreciated when the complexity and inferiority of a venting system in a conventional RB-MSF train (e.g., referring to FIGS. 5 and 6 of U.S. Pat. No. 10,577,269) are recognized.

Table 1 (e.g., the averaged and tested RO reject streams) indicates that calcium concentration is slightly less than sulfate concentration (about 0.86-0.92 of sulfate) but slightly more than twice bicarbonate concentration or magnesium concentration (expressed in meq./L). Nearly a half of calcium concentration may form precipitates comprising calcium carbonate in the first modified flashing stage [1]. The remaining concentrations of calcium and magnesium may be about the same in the first mixed brine stream [1M], and their combined concentration may be about the concentration of sulfate (expressed in meq./L). The first modified flashing stage [1] may remove about 600 mg/L of the TDS from the WWTRP's RO reject stream.

Figure 6:
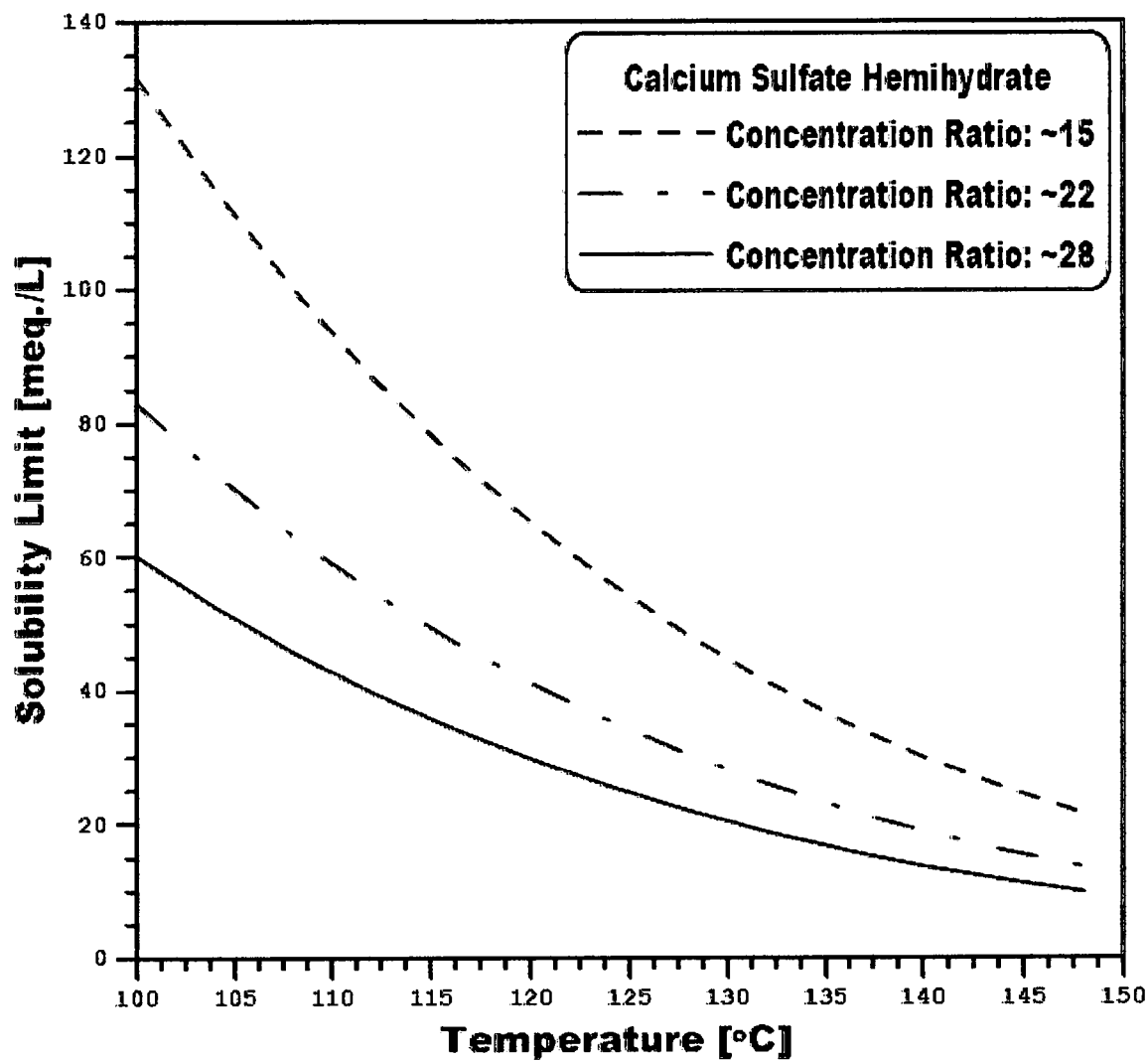
FIG. 6 illustrates the solubility limits of calcium sulfate hemihydrates.

At higher temperatures, calcium sulfate hemihydrate ($CaSO_4 \cdot \frac{1}{2}H_2O$) is the first to form of the calcium sulfate hydrates according to the rule of "stepwise sequence" of phase transformations (from less stable to more stable forms) even when the less water soluble and more stable anhydrite form ($CaSO_4$) is readily supersaturated. FIG. 6, as an approximate guide, shows the solubility limits of calcium sulfate hemihydrate as functions of temperature and concentration ratio of the tested WWTRP's RO reject stream for example (Table 1) after reducing its TDS level by about 600 mg/L. The reductions in the solubility limits of calcium sulfate hemihydrate by increasing the temperature from 100° C. to 120° C. and by increasing the temperature from 120° C. to about 150° C. at all concentration ratios are about 50% and 67%, respectively. Thus, increasing the temperature and concentration ratio substantially depresses the solubility limit.

Here, the essential function of the second modified flashing stage [2] is to remove sulfate from the first mixed brine stream [1M] by forming precipitates comprising the sulfate ion. This is the second key innovative step in the RB-MSF train. The natural depression in the solubility limits of calcium sulfate at higher temperatures and concentration ratios is utilized. This, in turn, allows minimizing the use of additive(s) and/or utilizing the additive(s) intermittently (as needed) rather than continuously. A multitude of variants can thus be utilized to conduct the sulfate removal in the second modified flashing stage [2].

In one variant, the first mixed brine stream [1M] from the first flashing stage [1] is released in the second modified flashing stage [2] to be contacted with an organic hydroxide source [12], wherein the organic hydroxide source is sprayed via nozzles [13] into the second modified flashing stage [2], thereby vigorously forming precipitates comprising calcium sulfate, and simultaneously recovering the organic hydroxide source [12A]. The recovered organic hydroxide source [12A] is recycled to the second modified flashing stage [2], and precipitates comprising sulfate [15] are removed from the second modified flashing stage [2] to produce a second heated mixed brine stream [2M] as a readily de-scaled stream (refers to it thereafter as a second mixed brine stream for simplicity). The organic solvent transforms the more water soluble metastable hemihydrate form to the less water soluble stable anhydrite form to attain fast precipitation, and the thereby formed precipitates comprise calcium sulfate anhydrite, calcium sulfate hemihydrate, and/or combinations thereof. The organic hydroxide source is selected from the group consisting of isopropylamine, propylamine, dipropylamine, diisopropylamine, ethylamine, diethylamine, methylamine, dimethylamine, ammonia, and/or combinations thereof.

In another variant, the first mixed brine stream [1M] is mixed with an inorganic source [14], and then it is released in the second modified flashing stage [2] to be contacted with the organic hydroxide source [12], wherein the organic hydroxide source is sprayed via nozzles [13] into the second modified flashing stage [2], thereby vigorously forming precipitates comprising magnesium-calcium sulfoaluminate, and simultaneously recovering the organic hydroxide source [12A]. The inorganic source is selected from the group consisting of aluminum hydroxide, sodium aluminate, aluminum chloride, and/or combinations thereof. Other aluminum based sources ($Al^{+3}$) may also be used. The addition of the inorganic source allows reducing sulfate to a level well below the already low solubility limit of calcium sulfate, and/or dissociating the fixed organic hydroxide source from its associated anions in the second modified flashing stage [2]. The recovered organic hydroxide source [12A] is recycled to the second modified flashing stage [2], and precipitates [15] are removed from the second modified flash stage [2] to produce a second mixed brine stream [2M] as a de-scaled stream. Iron ($Fe^{+3}$) based sources can also be used instead of the aluminum based sources to form precipitates comprising magnesium-calcium sulfoferrate.

In a further variant, the first mixed brine stream [1M] is mixed with an inorganic source [14], and then it is released in the second modified flashing stage [2] to be contacted with the organic hydroxide source [12], wherein the organic hydroxide source is sprayed via nozzles [13] into the second modified flashing stage [2], thereby vigorously forming precipitates comprising magnesium-calcium sulfoaluminate, and simultaneously recovering the organic hydroxide source [12A]. The inorganic source is selected from the group consisting of aluminum hydroxide, sodium aluminate, aluminum chloride, dolime, hydrated dolime, and/or combinations thereof. The addition of the inorganic source allows balancing the ratio of magnesium-calcium to sulfate (dolime or hydrated dolime since they may nearly equally provide magnesium and calcium oxides or hydroxides), reducing sulfate to a level well below the already low solubility limit of calcium sulfate (aluminum hydroxide), and/or dissociating the fixed organic hydroxide source from its associated anions (e.g., dolime, hydrated dolime, and/or aluminum hydroxide) in the second modified flashing stage [2]. The recovered organic hydroxide source [12A] is recycled to the second modified flash stage [2], and precipitates [15] are removed from the second modified flashing stage [2] to produce a second mixed brine stream [2M] as a de-scaled stream. Iron ($Fe^{+3}$) based sources can also be used instead of the aluminum based sources to form precipitates comprising magnesium-calcium sulfoferrate.

In yet a further variant, the first mixed brine stream [1M] is mixed with an inorganic source [14], and then it is released in the second modified flash stage [2] to be contacted with the organic hydroxide source [12], wherein the organic hydroxide source is sprayed via nozzles [13] into the second modified flash stage [2], thereby vigorously forming precipitates comprising calcium sulfoaluminate, and simultaneously recovering the organic hydroxide source [12A]. The inorganic source is selected from the group consisting of calcium aluminate, aluminum hydroxide, sodium aluminate, aluminum chloride, calcium chloride, lime, hydrated lime, and/or combinations thereof. The addition of the inorganic source allows balancing the ratio of calcium to sulfate (e.g., calcium aluminate, calcium chloride, lime, and/or hydrated lime), reducing sulfate to a level well below the already low solubility limit of calcium sulfate (e.g., calcium aluminate, sodium aluminate, aluminum chloride, and/or aluminum hydroxide), and/or dissociating the fixed organic hydroxide source from its associated anions (e.g., lime, hydrated lime, and/or aluminum hydroxide) in the second modified flashing stage [2]. The recovered organic hydroxide source [12A] is recycled to the second modified flashing stage [2], and precipitates [15] are removed from the second modified flashing stage [2] to produce a second mixed brine stream [2M] as a de-scaled stream. Iron ($Fe^{+3}$) based sources can also be used instead of the aluminum based sources to form precipitates comprising calcium sulfoferrate.

In yet a further variant, the first mixed brine stream [1M] is mixed with an inorganic source [14], and then it is released in the second modified flash stage [2] to be contacted with the organic hydroxide source [12], wherein the organic hydroxide source is sprayed via nozzles [13] into the second modified flash stage [2], thereby vigorously forming precipitates comprising magnesium sulfoaluminate, and simultaneously recovering the organic hydroxide source [12A]. The inorganic hydroxide source is selected from the group consisting of magnesium aluminate, aluminum hydroxide, sodium aluminate, aluminum chloride, magnesium chloride, magnesium oxide, magnesium hydroxide, and/or combinations thereof. The addition of the inorganic source allows balancing the ratio of magnesium to sulfate (e.g., magnesium aluminate, magnesium chloride, magnesium oxide, and/or magnesium hydroxide), reducing sulfate to a level well below the already low solubility limit of calcium sulfate (e.g., magnesium aluminate, sodium aluminate, aluminum chloride, and/or aluminum hydroxide), and/or dissociating the fixed organic hydroxide source from its associated anions (e.g., magnesium oxide, magnesium hydroxide, and/or aluminum hydroxide) in the second modified flashing stage [2]. The recovered organic hydroxide source [12A] is recycled to the second modified flashing stage [2], and precipitates [15] are removed from the second modified flashing stage [2] to produce a second mixed brine stream [2M] as a de-scaled stream. Iron ($Fe^{+3}$) based sources can also be used instead of the aluminum based sources to form precipitates comprising magnesium sulfoferrate.

It can be appreciated from the foregoing description that the first modified flashing stage [1] and the second modified flashing stage [2] are the heart of the inventive RB-MSF train. It can be also appreciated from the foregoing description that many variable factors are associated with the chemistry (biology as well) of given feed water. Therefore, for particular feed water, adjustments can be expected to be required. It can be further appreciated that the described first modified flashing stage [1] and second modified flashing stage [2] can be used as standalones and/or in combinations with any desalination system including, but not limited to, MVR, MED, MD, RO, NF, and the like.

Now, the second mixed brine stream [2M] enters the first flashing stage of the heat gain section [HGS] and cascades from flashing stage to flashing stage within the heat gain section [HGS], thereby producing the distillate stream [D] and the de-scaled reject brine stream [B]. At least a portion [1B] of the de-scaled reject brine stream [B] enters the last flashing stage the heat gain section [HGS] through the inner tubes of the second set of pre-heaters, which passes, in series, through the entire flashing stages of the heat gain section [HGS], the second modified flashing stage [2], the first modified flashing stage [1], and then the brine heater [BH] to produce the heated brine stream [3B]. The selected amount of this recycle brine portion [1B] of the de-scaled reject brine stream [B] (after gaining further heat in the brine heater [BH]), mixing with the pre-heated feed stream [4F] in the first modified flashing stage [1], and mixing with additives in the second modified flashing stage [2]) fixes the TDS level of the second mixed brine stream [2M] before the latter enters the first flashing stage of the heat gain section [HGS], thereby dictating the recovery ratio of the distillate stream [D] and the TDS level of the de-scaled reject brine stream [B]. Since the TDS level of a typical WWTRP's RO reject stream is very low (Table 1; the averaged and tested RO reject stream), and the first and second modified flashing stages de-toxify and de-scale the second mixed brine stream [2M], the de-scaled reject brine stream [B] may be discharged from the RB-MSF train at any desirable TDS level below 250,000 mg/L.

The level of residuals free and entrained fixed organic hydroxide source in the distillate stream [D], and more specifically, of the first flashing stage of the heat gain section [HSG] of the RB-MSF train, may be in the order of 5-20 mg/L. For industrial uses, this distillate stream would have a definite advantage as a readily boiler feed stream (e.g., OTSGs, drum-type boilers, etc.) since it provides the essential alkaline pH adjustment, in addition to the extreme low levels of TDS, TH, and DO. The distillate stream can also be utilized for washing/de-salting crude oil, among other utilities.

The de-scaled reject brine stream [B] from the RB-MSF train, as also readily de-oxygenated stream, lends itself for immediate utilities such as the high demand for properly treated saline water to improve oil recovery (e.g., water and/or hot water flooding and its related methods) within an oil reservoir, adjacent and/or nearby oil-fields.

Figure 7:
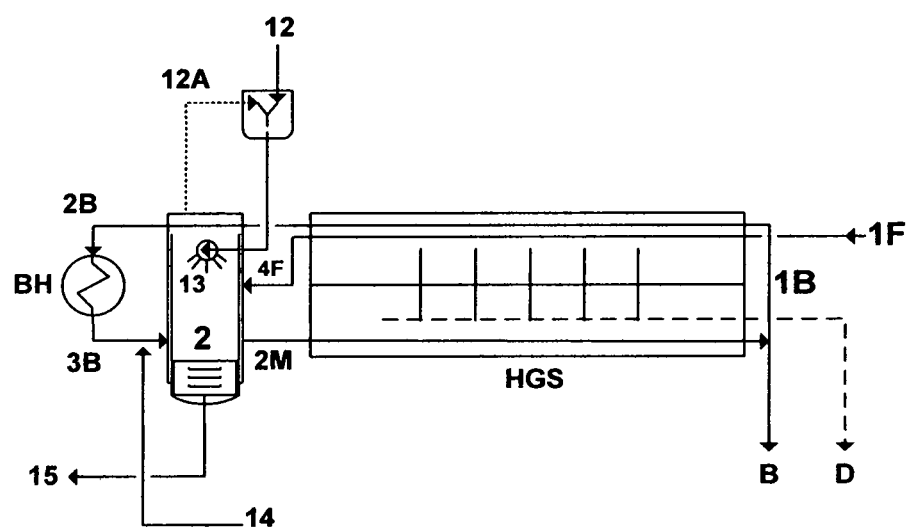
FIG. 7 illustrates another possible flow diagram for the RB-MSF train.

The modified flashing stages ([1] and [2]) as shown in FIG. 5 may be partitioned as part of the structural envelop of the heat gain section [HGS] of the RB-MSF train. The first modified flashing stage [1] may be eliminated, if a particular feed stream is readily substantially de-carbonated and/or de-aerated; thereby the heated brine stream [3B] from the brine heater [BH] is directly introduced to the second modified flashing stage [2] (now it becomes the only modified flashing stage) and the pre-heated feed stream from the heat gain section [HGS] is also introduced to the second modified flashing stage. This configuration is shown in FIG. 7.

Sour gas is typically immensely co-produced with heavy oil by steam injection. Aside from integrating the brine heater [BH] of the RB-MSF train with the steam generation cycle of OTSGs, this sour gas (or a portion of it; or a portion of it mixed lean gas) can be used to fuel one OTSG dedicated for providing wet steam to the brine heater. This sour gas can also be scrubbed by a slip stream of the second mixed brine stream [2M] of the RB-MSF train before fueling the OTSG [e.g., U.S. Pat. No. 10,258,920].

The inventive RB-MSF train has greater thermal economy using waste thermal energy (letdown steam) from OTSGs or sour gas to fuel a standalone OTSG to supply moderate quality steam to its brine heater. The single train has also greater capacity to treat the WWTRP's RO reject stream in its entirety (about 600,000 BPD). In addition, the train will last much longer (e.g., nearly 50 years of verifiable operations as given in U.S. Pat. No. 10,577,269) and cost much less than $1.222 billion. The inventive RB-MSF train is better designed since it may be the best way to: (1) utilize the alkalinity content within the WWTRP's RO reject stream, itself, to combat carbonate and phosphate scales; (2) thermally sterilize and isolate toxicity; (3) utilize mostly, if not totally, recoverable additives to combat sulfate scale and/or convert it to a useful product; and (4) produce distillate and de-scaled brine. All are to the contrary of the situations as may be depicted in FIG. 3B.

Combating carbonate and phosphate scales, thermally sterilizing toxicity in both the decanted liquid and precipitates, and using carbonate and phosphate precipitates as a sink to isolate toxicity, are all handled without adding any type of additive within the first modified flashing stage [1]. The thermal energy within the released carbon dioxide [V] from the first modified flashing stage [1] can be utilized to complete precipitates [15] drying in a combination with a filter (not shown in FIG. 5); thereby further sterilizing the precipitates, neutralizing the pH of the precipitates, producing dry cake, and possibly sequestering some of the released carbon dioxide [V]. This further sterilized, neutralized and dried cake can then be transferred safely to environmentally licensed landfills.

On the other hand, the system (as may be depicted in FIG. 3B) produces wet sludge (the clarifier's underflow). In addition to its high alkalinity, this toxic wet sludge is not subjected to disinfection (unlike the clarifier's overflow) or sterilization. Here, emphasis is placed on protecting downstream equipment by over disinfecting the clarifier's overflow by ozone and UV. Because the T-WWTRP is riddled with a multitude of filtration units (e.g., media filters, UF, RO or NF main treatment, IE, RO polishing treatment), it also requires producing abundant amounts of clean water just for backwashing (e.g., for all of these units), cleaning with chemicals (e.g., UF, NF and RO) and rinsing (e.g., IE). In as much as producing such additional amounts of clean water, the T-WWTRP also rejects them as exhausted and some toxic liquid waste. Abundant amounts of backwash rejects may be recycled to the clarifier, and the rest may be diverted to settling ponds (e.g., cleaning with chemicals). Depending on the frequency and flow rate of backwash waters, backwash rejects would affect the chemistry in the clarifier. Returned overflows from surge tanks that hold backwash rejects from the media filters before the disposal wells add a little more alkaline cations and sulfate (FIG. 3B) to the clarifier since the aqueous solubility limit of gypsum (calcium sulfate dihydrate) at ambient temperature may be about 2,250 mg/L. The latter translates to about 520 mg/L of calcium and 1,250 mg/L of sulfate in such overflows. But such overflows are laced with scale inhibitors, which, in turn, delay precipitation reactions in the clarifier. This would require adding more lime and more soda ash (to remove the unreacted added lime) into the clarifier; thereby increasing the amount of toxic alkaline wet sludge from the clarifier's underflow, and affecting the downstream treatment of the clarifier's overflow (e.g., may also decrease the recovery ratio of RO or NF main treatment due to possible increase in gypsum concentration). The underflow of the surge tanks (FIG. 3B) may also be removed as wet sludge enriched with alkaline cations and sulfate.

The use, recovery and recycle of the organic hydroxide source, both free and fixed, within the second modified flashing stage [2] is handled with great efficiency (>99% recovery) at minimal low cost (essentially adding the second modified flash stage to the RB-MSF train). This is because the free organic hydroxide source is recovered by sparging with the vapor flashed (e.g., steam) from the first heated mixed brine stream [1M], itself, in the second modified flash stage [2], thereby an external steam source is not needed. The fixed organic hydroxide source, which is the organic hydroxide salts that may form during de-scaling (e.g., the organic hydroxide source in anionated forms), is converted to free organic hydroxide source by adding the inorganic source [14], and the resulting free organic hydroxide source is also stripped by sparging with the vapor flashed from the brine [1M], itself, in the second modified flash stage. As such, a further innovative utility for the inorganic source is converting the fixed organic hydroxide source, which may be formed during de-scaling, to free organic hydroxide source. The whole operation of using, recovering and recycling the organic hydroxide source is essentially carried out within the second modified flash stage [2].

Most, if not all, of the products from the de-scaling step in the second modified flash stage [2] are useful minerals. If desirable or necessary, the recovery of the inorganic source (e g , aluminum hydroxide) can be achieved by acid (e.g., sulfuric acid) to decompose the precipitates [15], thereby recovering aluminum hydroxide for reuse in the second modified flash stage [2].

The inventive RB-MSF train is also suited to treat any type of feed water, including for example, but not limited, an effluent stream from a conventional WWTP, reject brine from an ion exchanging system, frack water, produced water, and/or combinations thereof.

The Waste Water Generation-Produced Water

Table 2 presents the predicted content of produced water by the SOLMINEQ program. Produced water is enriched with total hardness and total alkalinity, but depleted of sulfate. The moderately alkaline pH of produced water is amenable for silica to remain soluble. This prediction is consistent with subjecting the reservoir's formation to steam, since the formation largely comprises two separate sets of sand layers cemented with calcite, dolomite and clays. Based on the steam to oil ratio, the anticipated amount of produced water in Phase IA and Phase IB may be in the order of 100,000 BPD and 220,000 BPD, respectively. Calcium in such produced water will supersaturate the already nearly saturated aquifer water with calcium sulfate, which will lead to precipitate a huge mass of calcium sulfate at downhole temperature; thereby plugging the permeable zone of disposal wells. Silica in such produced water may build up very tenacious scale in downstream equipment and piping associated with disposal wells. A MVR system to treat such produced water will require excessive power for the compressor alone.

The predicted bicarbonate concentration in the produced water (Table 2) is about 3-fold higher than that in the WWTRP's RO reject stream (Table 1). Calcium concentration in such produced water is about twice bicarbonate concentration but about 40% of magnesium concentration (expressed in meq./L). The inventive RB-MSF train as shown in FIG. 5 can be used to treat such produced water in its entirety as described above with some chemistry adjustments. The essential function of the first modified flashing stage [1] is to remove calcium hardness, whereas essential function of the second modified flashing stage [2] is to remove magnesium hardness and silica. As shown in FIG. 5, produced water [1F] is used to feed the RB-MSF train. The first modified flashing stage [1] is used to remove carbon dioxide [V] and to form precipitates comprising calcium carbonate [11]; thereby essentially removing the calcium hardness. In one variant, the first mixed brine stream [1M] from the first flashing stage [1], which essentially contains magnesium hardness and silica, is released in the second modified flashing stage [2] to be contacted with the organic hydroxide source [12], wherein the organic hydroxide source is sprayed via nozzles [13] into the second modified flashing stage [2], thereby vigorously forming precipitates comprising magnesium hydroxide and magnesium silicates [15], and simultaneously recovering the organic hydroxide source [12A]. Here, the formed magnesium hydroxide from the produced water itself upon spraying the organic solvent is, in turn, utilized to remove silica as well as to enhance the recovery of the organic solvent. In this variant, the inorganic source [14] as shown in FIG. 5 is not utilized. The recovered organic hydroxide source [12A] is recycled to the second modified flashing stage [2], and precipitates [15] are removed from the second modified flashing stage [2] to produce a second mixed brine stream [2M] as essentially free of total hardness and substantially free of silica. The remaining steps of the RB-MSF train for treating produced water are identical to the steps as described above for treating the WWTRP's RO reject stream.

In another variant, the first mixed brine stream [1M] is mixed with an inorganic source [14], and then it is released in the second modified flashing stage [2] to be contacted with the organic hydroxide source [12], wherein the organic hydroxide source is sprayed via nozzles [13] into the second modified flashing stage [2], thereby vigorously forming precipitates comprising magnesium hydroxide and magnesium aluminosilicate (the latter may also refer to as magnesium silicoaluminate), and simultaneously recovering the organic hydroxide source [12A]. The inorganic source is selected from the group consisting of aluminum hydroxide, sodium aluminate, aluminum chloride, and/or combinations thereof. Iron ($Fe^{+3}$) based sources can also be used instead of the aluminum based sources to form precipitates comprising magnesium silicoaluminate.

It should be noted here that a caustic source such as sodium hydroxide, potassium hydroxide and the like can be used instead of the organic hydroxide source but the main drawbacks are that the pH must be adjusted twice and such caustic sources are not recoverable. On the other hand, the use of organic hydroxide eliminates both drawbacks.

Figure 8:
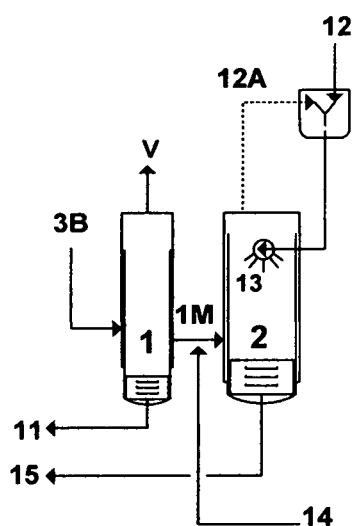
FIG. 8 illustrates a possible flow diagram for the inventive standalone modified flashing stages.

Wet heavy oil emulsion via steam injection is typically produced at higher temperatures (e.g., 120-150° C.). The emulsion is then subjected to partial cooling, followed by free-water knockout tank and oil treater to separate the bulk of oil from the bulk of produced water. This hot produced water is then cooled further and after than is de-oiled conventionally by a skim tank, induced gas flotation, nutshell filter, and/or combinations thereof. However, this hot produced water, instead of wasting its thermal energy in a cooler in order to conventionally de-oil, it can be directly de-oiled by hydrophobic membranes as has been taught by this inventor in several patent. Here, the modified flashing stages can be used as standalones to de-scale the hot produced water as shown in FIG. 8. The hot and de-oiled (preferably by hydrophobic membranes) produced water [3B] is flashed in the first modified flashing stage [1] to remove calcium hardness, and then it is passed [1M] to the second modified flashing stage [2] to be flashed and contacted by the organic hydroxide source [12] to remove magnesium hardness and silica (as precipitates comprising magnesium hydroxide, magnesium silicate, and/or combinations thereof). The inorganic source [14] can also be mixed with produced water after removing it is calcium hardness [1M] before it enters the second flashing stage [2] to remove magnesium hardness and silica (as precipitates comprising magnesium silicoaluminate).

The Waste "T-WWTRP" Generation

The liquid Waste Scale Generation

Figure 3A:
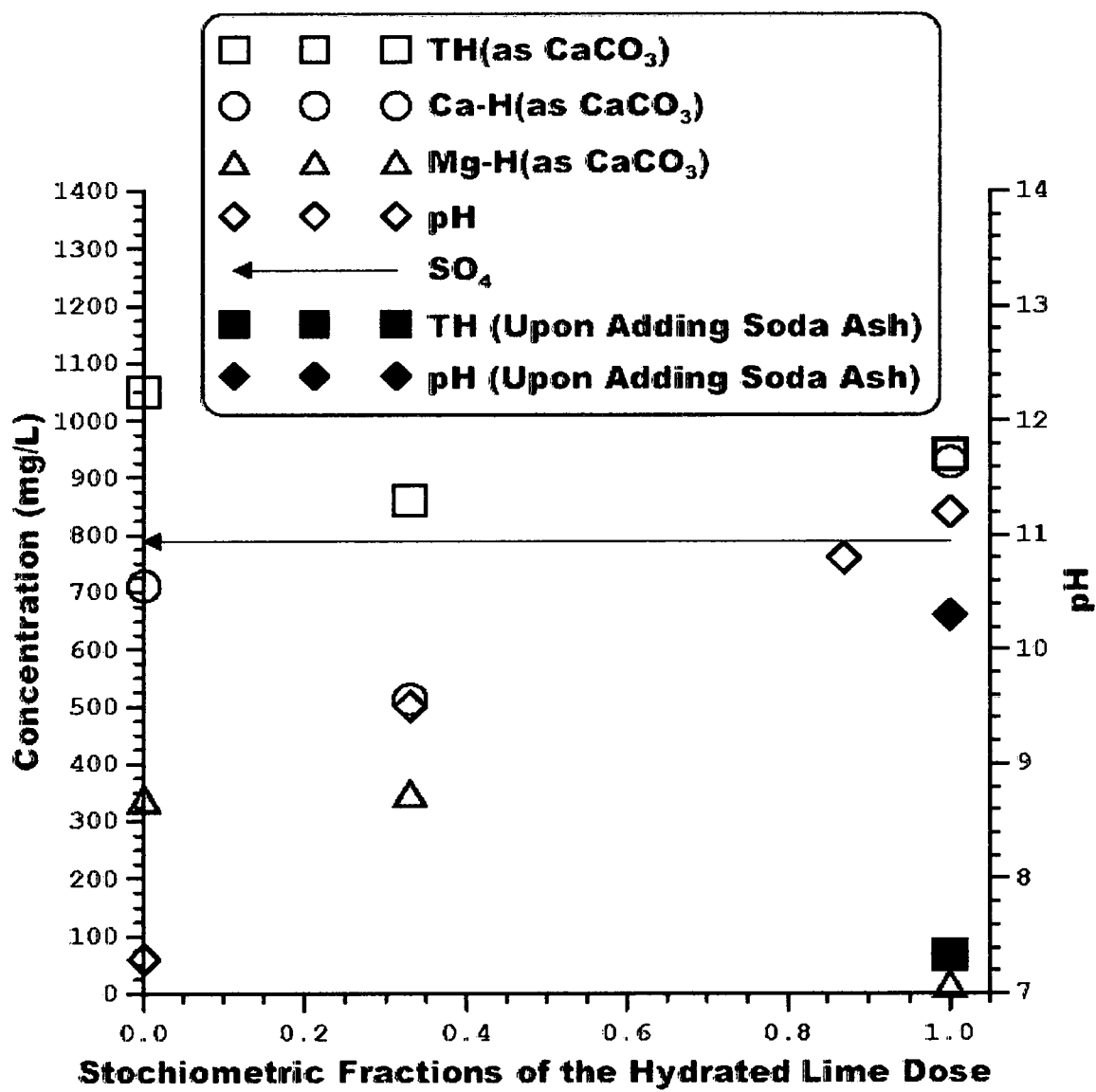
FIG. 3A illustrates the testing of a WWTRP's RO reject stream by hydrated lime and soda ash.
Figure 3B:
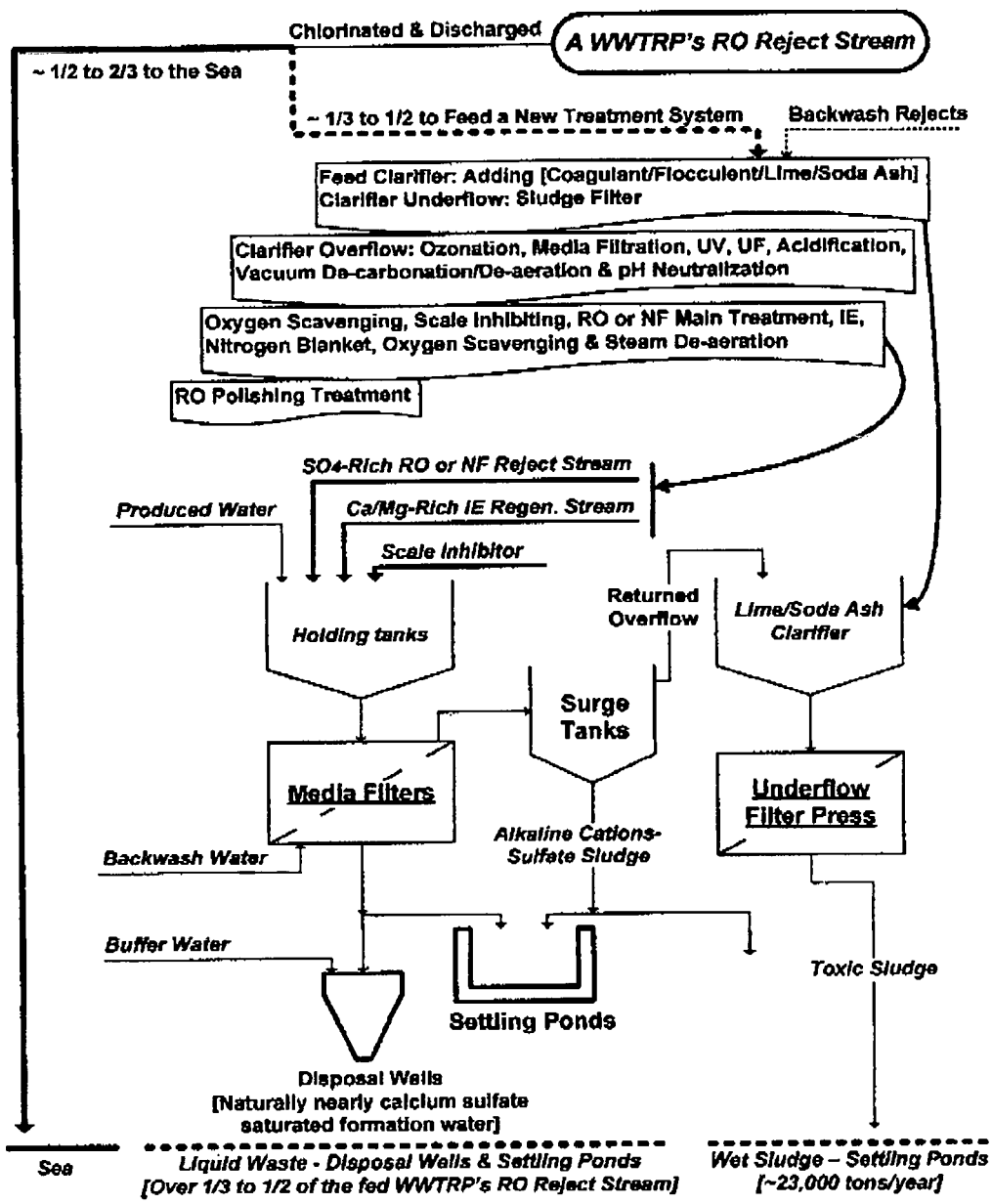
FIG. 3B illustrates the expansion of waste generation paths.
Figure 4:
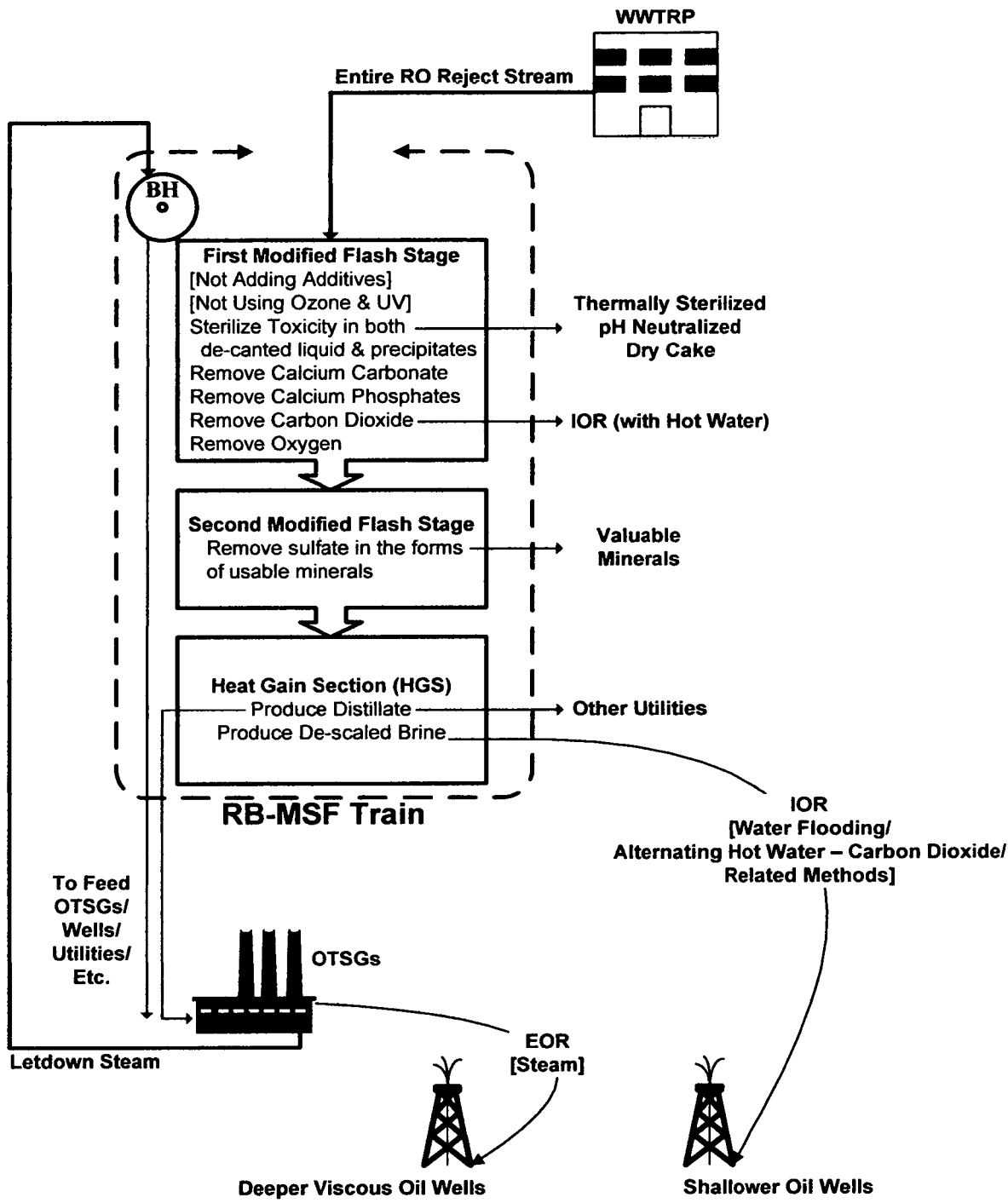
FIG. 4 is an overall summary for one of the embodiments of this invention.

FIG. 3B may depict the liquid waste scale path from the T-WWTRP by treating a portion of the WWTRP's RO reject stream including the co-extracted produced water with heavy oil by steam. The NF reject stream from the T-WWTRP will be slightly below the saturation limit of gypsum. The presented ion content of the NF reject stream in Table 2 (NF-RS) is based on the tested WWTRP's RO reject stream (Table 1; RORS-T) by the inventor, after treating the tested WWTRP's RO reject with hydrated lime/soda ash followed by UF, acid, de-carbonation/de-aeration, and pH neutralization, to feed NF. The anticipated amount of the NF reject stream resulting from the T-WWTRP may be in the order of 66,000 BPD. The IE reject brine as shown in Table 2 (IE-RB) will be in the forms sodium, magnesium and calcium chlorides, thereby high in magnesium and calcium. The anticipated amount of the IE reject brine from the T-WWTRP will be very small. If RO, instead of NF, is used as the second main treatment step in the T-WWTRP, the RO reject stream will also be slightly below the saturation limit of gypsum with an amount in the order of 150,000 BPD. This RO reject stream is thus more than the required amount of treated water by the T-WWTRP to feed OTSGs (100,000 BPD) and the anticipated amount of the extracted produced water with heavy oil by steam in Phase IA, and slightly less than a half the amount of the WWTRP's RO reject stream that will feed the T-WWTRP.

One embodiment to treat the liquid waste from the T-WWTRP (NF or RO reject stream, and IE reject brine) by the inventive RB-MSF train is essentially described above and depicted in FIG. 5 with some adjustment. Here, the NF reject stream (or the RO reject stream) resulting from the T-WWTRP is used as a feed stream [1F] for the RB-MSF train. The calcium/magnesium-rich IE reject brine resulting also from the T-WWTRP (not shown in FIG. 5) is used in combinations with the inorganic source [14] to form precipitates comprising calcium sulfoaluminate [15] in the second flashing stage [2] of the RB-MSF train; wherein the inorganic source is selected from the group consisting of aluminum hydroxide, sodium aluminate, aluminum chloride, and/or combinations thereof. The addition of the IE reject brine essentially allows balancing the ratio of calcium to sulfate; thereby reducing sulfate to a level well below the already low solubility limit of calcium sulfate. Since the co-extracted produced water with heavy oil by steam is abundant, and enriched with calcium/magnesium but depleted of sulfate, at least a portion of this produced water may be also be used, if needed, to augment the inorganic source [14] (the IE reject brine and the aluminum source). Iron ($Fe^{+3}$) based sources can also be used instead of the aluminum based sources to form precipitates comprising calcium sulfoferrate. The remaining steps for conducting the RB-MSF train are identical to the steps as described above for treating the WWTRP's RO reject stream.

However, since the NF (or RO) feed stream in the T-WWTRP is de-carbonated and de-aerated (by an acid followed by a vacuum de-carbonator/de-aerator, a pH neutralizer, and then an oxygen scavenger), the NF (or RO) reject stream of the T-WWTRP is essentially readily de-aerated. In consequence, the RB-MSF train is further simplified as shown in FIG. 7, wherein the first flashing stage [1] as compared to FIG. 5 is eliminated. In another embodiment, the heated brine stream [3B] (which is a recycle portion of the de-scale reject brine stream) and the pre-heated feed stream [2F] as shown in FIG. 7 are alternatively introduced to the second flashing stage [2], and wherein the inorganic hydroxide source [14] is mixed with the heated brine stream [3B] before the latter enters the second flashing stage [2]. Here again, the calcium/magnesium-rich IE reject brine resulting also from the T-WWTRP (along with, if needed, a portion of the co-extracted produced water with heavy oil by steam to augment the IF reject brine) is used in combinations with the inorganic source [14]. The remaining steps for conducting the RB-MSF train are identical to the steps as described above for treating the WWTRP's RO reject stream.

Figure 9:
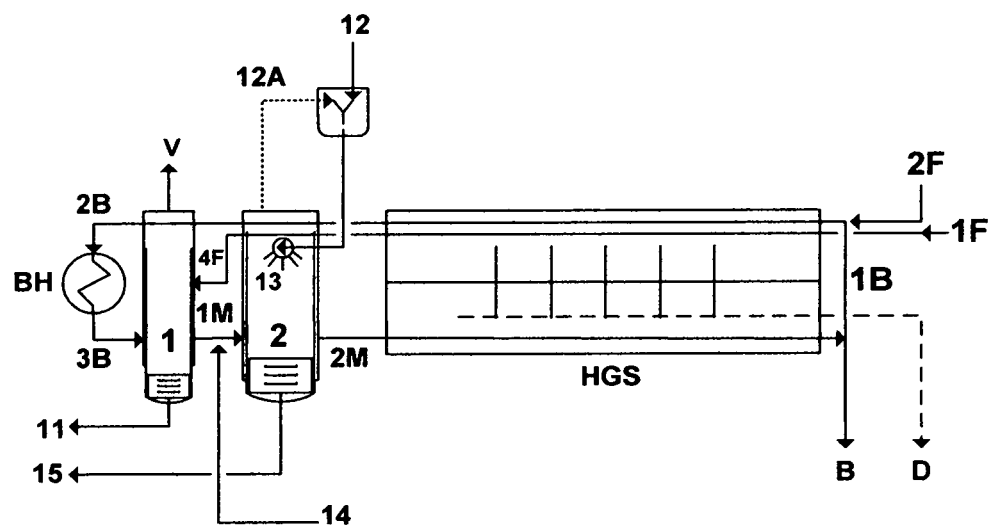
FIG. 9 illustrates a further possible flow diagram for the RB-MSF train.

In a further embodiment, the RB-MSF train as shown in FIG. 9 can be used to treat the: (1) NF (or RO) reject stream resulting from the T-WWTRP; (2) IE reject brine resulting from the T-WWTRP; and (3) co-extracted produced water with heavy oil by steam injection. Here, two adjustments may be made as follows. The first one is that the produced water and the IF reject brine resulting from the T-WWTRP, since they are both high in total hardness and depleted of sulfate, are introduced together as a feed stream [1F] to the inner tubes of the first set of pre-heaters, which passes through the entire flashing stages of the heat gain section [HGS] and the second modified flashing stage [2], thereby producing a pre-heated feed stream [4F] at the exit of the second modified flashing stage [2]. The second one is that the recycled portion [1B] of the de-scaled reject brine stream [B] from the RB-MSF train and the NF (or RO) reject stream resulting from the T-WWTRP [2F], since they are both de-aerated, are introduced together as one stream to the inner tubes of the second set of pre-heaters, which passes, in series, through the entire flashing stages of the heat gain section [HGS], the second modified flashing stage [2], and the first modified flashing stage [1], before it [2B] passes through the brine heater [BH] to gain further heat, thereby producing the heated brine stream [3B]. However, a second portion of the de-scaled brine stream [B] can also be recycled and introduced along with the produced water and the IE reject brine to the inner tubes of the first set of pre-heaters (not shown in FIG. 9). A vigorous evolution of carbon dioxide [V] and an abundance of carbonate ions would form to precipitate [11] as calcium carbonate upon introducing the heated brine stream [3B] and the pre-heated feed stream [4F] into the free space of the first modified flashing stage [1]. Because the NF (or RO) reject stream resulting from the T-WWTRP is nearly saturated with gypsum and the produced water is high in total hardness, an equilibrium condition would also exist to co-precipitate some calcium sulfate and magnesium hydroxide along with calcium carbonate. The first mixed brine stream [1M] from the first flashing stage [1] is then released in the second modified flashing stage [2] to be contacted with the organic hydroxide source [12], wherein the organic hydroxide source is sprayed via nozzles [13] into the second modified flashing stage [2], thereby vigorously forming precipitates comprising calcium sulfates, magnesium hydroxide and magnesium silicate. Alternatively, the first mixed brine stream [1M] is mixed with an inorganic source [14], and then it is released in the second modified flashing stage [2] to be contacted with the organic hydroxide source [12], wherein the organic hydroxide source is sprayed via nozzles [13] into the second modified flashing stage [2], thereby vigorously forming precipitates comprising magnesium sulfosilicoaluminate, and simultaneously recovering the organic hydroxide source [12A]. Here, the inorganic source is selected from the group consisting of aluminum hydroxide, sodium aluminate, aluminum chloride, and/or combinations thereof. The remaining steps for conducting the RB-MSF train are identical to the steps as described above for treating the WWTRP's RO reject stream.

The Solution to Liquid Waste Scale Solves the Toxic Sludge Generation

To this end, the co-extracted produced water with heavy oil by steam injection and/or the two specific liquid reject streams [the NF (or RO) reject stream, and the IE reject brine] resulting from the T-WWTRP are resolved by the RB-MSF train, but the resulting toxic wet sludge from the clarifier underflow of the T-WWTRP is not. Here, the purpose is not reverse engineering this T-WWTRP, but eliminating the generated waste by re-utilizing it. The quality of the distillate stream [D] from the RB-MSF train is very high, which would eliminate the RO polishing unit of the T-WWTRP in its entirety. The distillate stream [D] from the RB-MSF train can also eliminate the entire clarifier of the T-WWTRP; thereby eliminating the clarifier's underflow toxic wet sludge and the clarifier's overflow redundant treatment steps (ozone, media filters, and UV) by recycling a portion of the distillate stream [D] to the NF feed stream of the T-WWTRP. This recycled potion of the distillate stream [D] (may be 10-20%) would reduce the total hardness in the NF feed stream to a level equivalent to the reduction level by lime/soda ash in the clarifier of the T-WWTRP, yet without increasing the total alkalinity (soda ash), thereby without increasing the amount of acid to convert carbonates to carbon dioxide prior to applying the vacuum de-carbonator/de-aerator. The reason of recycling a portion of the distillate stream [D] rather than the de-scaled brine [B] from the RB-MSF train is that NF partially removes sodium chloride, which would affect the followed IE treatment of the NF product stream in the T-WWTRP. If RO is used, instead of NF, as the second main treatment step in the T-WWTRP, then a portion of the RO product stream itself, the distillate stream [D] from the RB-MSF train, the de-scaled brine stream [B], and/or combinations thereof can be recycled to the RO feed stream of the T-WWTRP.

Figure 10A:
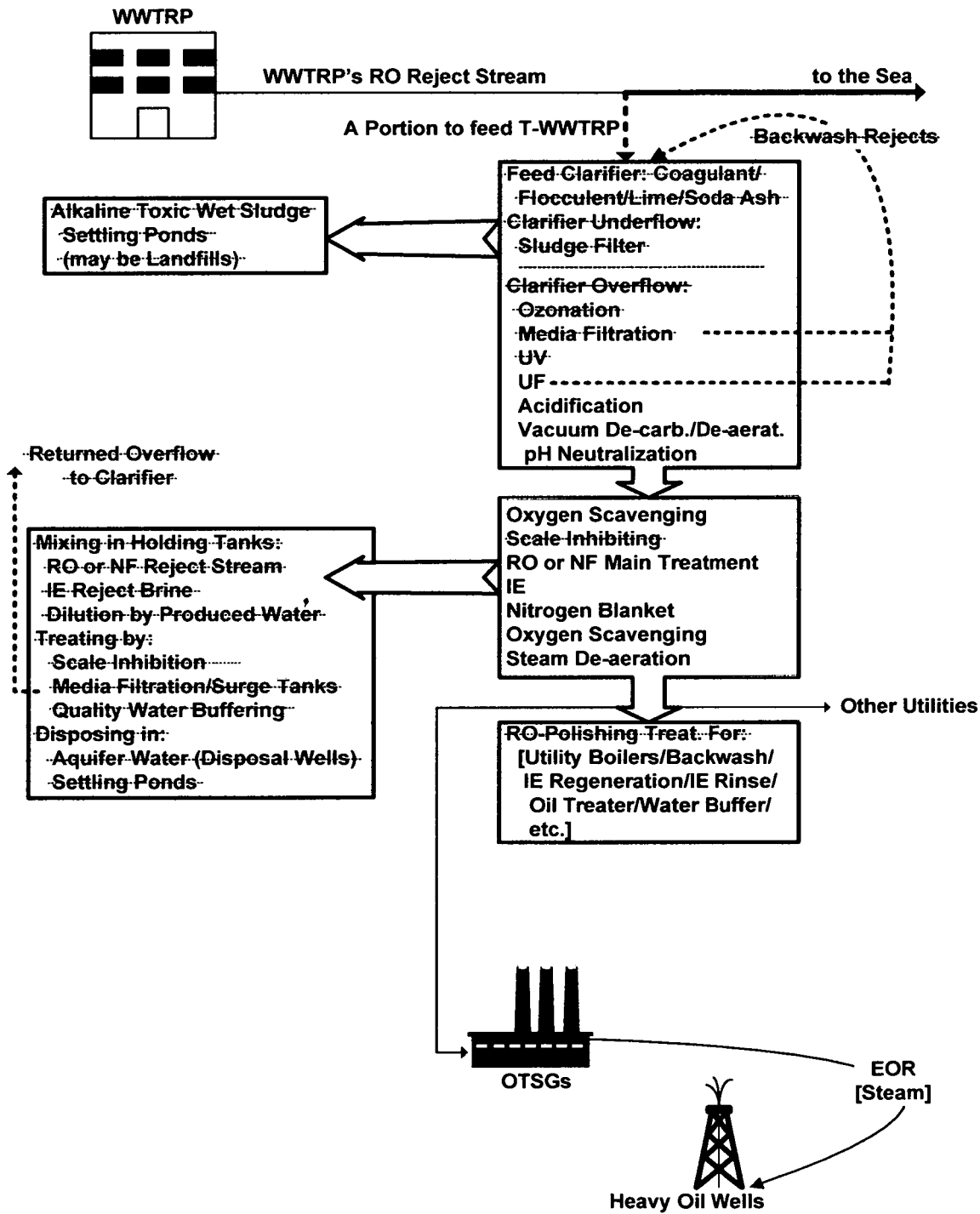
FIG. 10A illustrates simplifying the processing steps of the T-WWTRP.
Figure 10B:
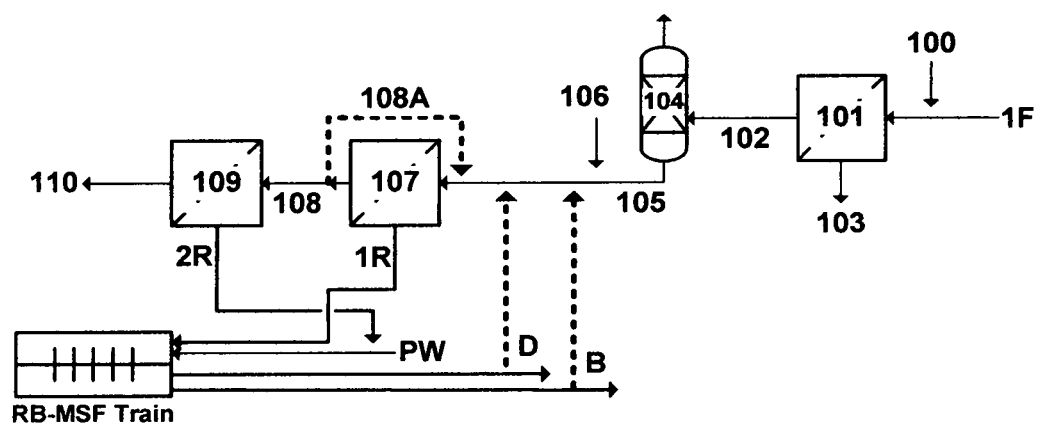
FIG. 10B illustrates the simplified T-WWTRP in conjunction with the RB-MSF train.

FIGS. 10A and 10B illustrate such alternative waste elimination methods. The following steps are eliminated in the T-WWTRP as shown in FIG. 9A (crossed over by the dotted lines): (1) the clarifier along with all of its additives; (2) the clarifier underflow along with all of its sludge filter, toxic wet sludge and settling tanks and/or ponds; (3) the clarifier overflow along with most of its treatment steps (ozone, media filter and UV); and (4) all returned backwash rejects to the clarifier. As alternatively shown in FIG. 10B, the WWTRP's RO reject stream [1F] is now acidified by acid [100] prior to applying the UF [101]. This is unlike the arrangement in the T-WWTRP, where the UF product stream (not the UF feed stream) is subjected to acidification. The main reason of such eliminations (the clarifier and most its associated steps) and reversal (acidification prior to UF) is the nature of the interactions between proteins and endotoxins in wastewater, which may be explained as follows: (1) acidic proteins in wastewater and derivative streams of wastewater may constitute about 70-80% of the total content of proteins, wherein acidic proteins are negatively charged, hydrophilic and with an isoelectric point of about 5.5; (2) the remaining content of proteins is basic, positively charged, hydrophobic, and with an isoelectric point of about 9.2; (3) endotoxins are negatively charged, which interact with acidic proteins via mediators including the naturally present divalent cations (calcium and magnesium) in wastewater, and with basic proteins via direct charge attractions and water exclusion by clustering as hydrophobic groups; and (4) the thereby net charge of the overall content of proteins under typical pH conditions (6.5-7.4) in wastewater is negative. The addition of hydrated lime and soda ash to WWTRP's RO reject stream in the clarifier of the T-WWTRP not only raises the pH but also adds more calcium and sodium; thereby indiscriminately substantially precipitating proteins including endotoxins along with other precipitates as wet toxic sludge. This wet toxic sludge is neither subjected to disinfection nor thermal sterilization, but may be dumped in settling ponds. On the other hand, the clarifier overflow of the T-WWTRP is further disinfected by ozone followed by media filter to facilitate more disinfection by UV, when this over disinfected overflow will be fed to OTSGs (after a multitude of treatment steps), where any toxicity will be essentially thermally destructed. In other words, the emphasis is placed on over disinfecting the clarifier overflow to protect downstream treatment steps, but not so on the bulk of toxicity within the clarifier underflow wet sludge.

One of the alternatives in this invention reverses this situation by completely eliminating toxic wet sludge generation, separating the bulk of proteins from endotoxins, and thermally destructing toxicity. Thus, the acidification [100] of the WWTRP's RO reject stream prior to applying UF [101] as shown in FIG. 10B at a pH of about 5.5 allows neutralizing acidic proteins; thereby disengaging this major content of proteins from masking and caging endoxtoins within their inner structures. UF is based on size exclusion, thereby it would reject most of such proteins but it is not expected to remove endoxtoins, where most of the latter would be carried over in the UF product stream [102]. The UF product stream [102] is fed to the vacuum de-carbonator/de-aerator [104], and the de-carbonated and de-aerated stream [105] is neutralized by a pH neutralizer [106] before it is fed to NF [107]. The negatively charged endoxtoins will be effectively rejected by the negatively charged NF membranes (not just partially by the NF ineffective size exclusion). By feeding the NF reject stream [1R] to the RB-MSF train, the rejected endoxtoins in the NF reject stream [1R] will be thermally destroyed in the RB-MSF train as described above. The NF product stream [108] is passed through the IE [109] to polish the total hardness, and the polished stream [110] is essentially thereafter fed to OTSGs, where any toxicity will be thermally destroyed. By also feeding the IE reject brine [2R] to the RB-MSF train, any toxicity in the IE reject brine [2R] will be thermally destroyed in the RB-MSF train as also described. The UF reject stream [103], which may be in the order of 5% of the feed stream [1F] can be de-canted by a vacuum filter, for example, where the blowdown (essentially acidic proteins and suspended solids within the WWTRP's RO reject stream) is further sterilized and dried by sparging steam for immediate haulage to an incineration facility, and the de-canted water is recycled to the feed stream [1F]. This would eliminate toxic wet sludge generation by hydrated lime/soda ash, and sludge handling liability. As shown in FIGS. 10A and 10B, the T-WWTRP is reduced to four treatment units (UF, the vacuum de-carbonator/de-aerator, NF (or RO), and IE).

TABLE 1

Effluent and RO Reject Streams from a WWTRP.

| Species | ES-A | RORS-A | OTSG-S | RORS-T | RORS-O |
|---|---|---|---|---|---|
| $Na^+$ | 156.3 | 950.9 | | 1,280.0 | |
| $K^+$ | 12.6 | 79.8 | | 84.1 | |
| $Mg^{+2}$ | 11.9 | 76.2 | | 82.2 | |
| $Ca^{+2}$ | 45.0 | 290.8 | | 284.5 | |
| $Fe^{+2}$ | 0.08 | 0.14 | 0.2 | 0.2 | |
| $Cl^-$ | 239.7 | 1,462.2 | | 1735.0 | 2,800.0 |
| $HCO_3^-$ | 97.8 | 416.6 | | 426.4 | 610.0 |
| $SO_4^{-2}$ | 120.3 | 760.1 | | 790.0 | 1990.0 |
| TP | 11.5 | 63.6 | | 17.3 | 41.2 |
| $SiO_2$ | 2.1 | 13.3 | 50 | 11.5 | |
| TSS | | 1.5 | | 1.2 | 1.0 |
| TDS | 690.8 | 4,096.9 | 8,000-12,000 | 4,719.0 | 5,930.0 |
| TH | 161.5 | 1,040.6 | 0.5 | 1,050.0 | 2,660.0 |
| TA | 80.2 | 341.5 | | 350.0 | 500.0 |
| COD | 319.0 | 379.0 | | 345.0 | 114.0 |
| TOC | 0.1 | 0.2 | 5 | 0.2 | 0.0 |
| DO | 6.0 | 6.0 | 0.007-0.02 | 7.0 | 6.0 |
| pH | 6.7 | 7.1 | 8.8-10.5 | 7.3 | 7.1 |

Species: in mg/L;
ES-A: Average Effluent Stream;
RORS-A: Average RO Reject Stream;
OTSG-S: Feed Water Specifications for Once-Through Steam Generators;
RORS-T: Tested RO Reject Stream;
RORS-O: Outlier RO Reject Stream;
TP: Total Phosphorous;
TH: Total Hardness;
TA: Total Alkalinity;
COD: Chemical Oxygen Demand;
TOC: Total Oil Content; and
DO: Dissolved Oxygen.

TABLE 2

Streams from Different Sources within Heavy Oil Recovery by Steam.

| Ion | NF | | IE | Heavy Oil Reservoir | | | |
|---|---|---|---|---|---|---|---|
| (mg/L) | PS | RS | RB | GW | BW | SW | PW |
| $Na^+$ | 1,185 | 1,502 | 13,283 | 51 | 1,798 | 8,757 | 13,500 |
| $Mg^{+2}$ | 30 | 162 | 1,332 | 64 | 145 | 1,242 | 1,056 |
| $Ca^{+2}$ | 158 | 486 | 6,987 | 56 | 760 | 1,404 | 736 |
| $Cl^-$ | 1,612 | 2,023 | 36,748 | 181 | 3,381 | 19,687 | 24,500 |
| $HCO_3^-$ | 3 | 9 | 0 | 124 | 162 | 424 | 1,123 |
| $SO_4^{-2}$ | 19 | 2,589 | 0 | 130 | 1,350 | 0.1 | 32 |
| $SiO_2$ | | | 0 | 0.4 | | 6.1 | 117 |
| TDS | 3,085 | 6,870 | 58,350 | 567 | 7,596 | 31,770 | 41,064 |
| TH | 427 | 1,879 | 22,930 | 402 | 2,509 | 8,602 | 6,170 |
| pH | 8.0 | 8.0 | 6.9 | 8.1 | 7.7 | 6.9 | 9.1 |

PS: NF Product Stream; RS: NF Reject Stream; RB: IE Reject Brine; GW: Groundwater; BW: Brackish Water; SW: Saline Water; and PW: Produced Water.

What is claimed is:

1. A method for producing a distillate stream and a de-scaled reject brine stream, said method comprising a recycle brine multi-stage flash (RB-MSF) train;
   wherein said RB-MSF train comprises a brine heater and a heat gain section, wherein said heat gain section comprises a plurality of flashing stages arranged in series,
   wherein each of said flashing stages comprises a flashing zone and a heating zone,
   wherein a first set of pre-heating tubes and a second set of pre-heating tubes pass through said heating zone of each of said flashing stages;

wherein said RB-MSF train further comprises a first modified flashing stage and a second modified flashing stage, wherein said first modified flashing stage comprises said first set of pre-heating tubes, wherein said second modified flashing stage comprises said first set of pre-heating tubes and said second set of pre-heating tubes;

wherein a feed stream enters said first set of pre-heating tubes, which passes through the flashing stages of said heat gain section and said second modified flashing stage, thereby producing a pre-heated feed stream at the exit of said second modified flashing stage;

wherein at least a portion of said de-scaled reject brine stream as recycle brine enters said second
    set of pre-heating tubes, which passes, in series, through the flashing stages of said heat gain section, said second modified flashing stage, and said first modified flashing stage, before passing through said brine heater to gain further heat, thereby producing a heated brine stream at the exit of said brine heater;

wherein: (a) said pre-heated feed stream is released in said first modified flashing stage to be contacted with said heated brine stream, whereby said pre-heated feed stream is de-carbonated, de-gassed, or sterilized, or combinations thereof by the vapor flashed from said heated brine stream, whereby evolved gases and formed first precipitates are removed from said first modified flashing stage to produce a first mixed brine stream; and (b) wherein said first mixed brine stream is released in said second modified flashing stage to be contacted with an organic hydroxide source to form second precipitates and simultaneously recover said organic hydroxide source, wherein the recovered organic hydroxide source is recycled to said second modified flashing stage, and said second precipitates are removed from said second modified flashing stage to produce a second mixed brine stream; and wherein said second mixed brine stream enters a first flashing stage of said heat gain section and cascades from flashing stage to flashing stage within said heat gain section, thereby producing said distillate stream and said de-scaled reject brine stream.

2. The method of claim 1, further comprising conducting said first modified flashing stage at a temperature of at least 120° C. to sterilize bacteria comprising endotoxins.

3. The method of claim 1, wherein said first precipitates comprise calcium carbonate, calcium phosphate, magnesium carbonate, magnesium phosphate, endotoxins, or proteins, and combinations thereof.

4. The method of claim 1, wherein said organic hydroxide source is selected from the group consisting of isopropylamine, propylamine, dipropylamine, diisopropylamine, ethylamine, diethylamine, methylamine, dimethylamine, ammonia, and combinations thereof.

5. The method of claim 1, wherein said feed stream comprises sulfates, wherein said second precipitates comprise calcium sulfate hemihydrate, or calcium sulfate anhydrite, and combinations thereof.

6. The method of claim 1, wherein said feed stream is depleted of sulfate and comprises magnesium and silica, wherein said second precipitates comprise magnesium hydroxide, or magnesium silicate, and combinations thereof.

7. The method of claim 1, further comprising intermittently releasing said organic hydroxide source into said second modified flashing stage.

8. The method of claim 1, wherein step (b) further comprises mixing said first mixed brine stream with an inorganic source, and then releasing the mixture in said second modified flashing stage to be contacted with said organic hydroxide source to form said second precipitates comprising magnesium-calcium sulfoaluminate, calcium sulfoaluminate, or magnesium sulfoaluminate, and combinations thereof, and simultaneously recovering said organic hydroxide source, wherein said feed water comprises sulfates, and wherein said inorganic source is selected from the group consisting of aluminum hydroxide, sodium aluminate, aluminum chloride, dolime, hydrated dolime, calcium aluminate, calcium chloride, lime, hydrated lime, magnesium aluminate, magnesium chloride, magnesium oxide, or magnesium hydroxide, and combinations thereof.

9. The method of claim 1, wherein step (b) further comprises mixing said first mixed brine stream with an inorganic source, and then releasing the mixture in said second modified flashing stage to be contacted with said organic hydroxide source to form said second precipitates comprising magnesium hydroxide, or magnesium silicoaluminate, and combinations thereof, and simultaneously recovering said organic hydroxide source, wherein said feed stream is depleted of sulfate and comprises magnesium and silica, wherein said inorganic source is selected from the group consisting of aluminum hydroxide, sodium aluminate, aluminum chloride, and combinations thereof.

10. The method of claim 1, further comprising using said de-scaled reject brine stream in oil recovery systems.

11. A method for producing a distillate stream and a de-scaled reject brine stream, said method comprising a recycle brine multi-stage flash (RB-MSF) train;

wherein said RB-MSF train comprises a brine heater and a heat gain section, wherein said heat gain section comprises a plurality of flashing stages arranged in series, wherein each of said flashing stages comprises a flashing zone and a heating zone, wherein a first set of pre-heating tubes and a second set of pre-heating tubes pass through said heating zone of each of said flashing stages;

wherein said RB-MSF train further comprises a modified flashing stage, which comprises said second set of pre-heating tubes;

wherein a feed stream enters said first set of pre-heating tubes, which passes through the flashing stages of said heat gain section, thereby producing a pre-heated feed stream at the exit of said heat gain section;

wherein at least a portion of said de-scaled reject brine stream as recycle brine enters said second set of pre-heating tubes, which passes, in series, through the flashing stages of said heat gain section and said modified flashing stage, before passing through said brine heater to gain heat, thereby producing a heated brine stream at the exit of said brine heater;

wherein said heated brine stream is mixed with an ion exchange (IE) reject brine, and then the mixture is released in said modified flashing stage to be contacted with an organic hydroxide source to form precipitates and simultaneously recover said organic hydroxide source, wherein the recovered organic hydroxide source is recycled to said modified flashing stage and said precipitates are removed from said modified flashing stage to produce a mixed brine stream, wherein said IE reject brine comprise calcium-magnesium chloride; and wherein said mixed brine stream enters a first flashing stage of said heat gain section and cascades from flashing stage to flashing stage within said heat gain section, thereby producing said distillate stream and said de-scaled reject brine stream.

12. The method of claim 11, wherein said first feed stream comprises sulfate, thereby said second precipitates comprise calcium sulfate hemihydrate, or calcium sulfate anhydrite, and combinations thereof.

13. The method of claim 11, wherein said organic hydroxide source is selected from the group consisting of isopropylamine, propylamine, dipropylamine, diisopropylamine, ethylamine, diethylamine, methylamine, dimethylamine, ammonia, and combinations thereof.

14. The method of claim 11, further comprising mixing said heated brine stream with an inorganic source, and then releasing the mixture in said modified flashing stage to be contacted with said organic hydroxide source to form said precipitates comprising magnesium-calcium sulfoaluminate and simultaneously recovering said organic hydroxide source, wherein said inorganic source is selected from the group consisting of aluminum hydroxide, sodium aluminate, aluminum chloride, and combinations thereof.

15. The method of claim 11, further comprising conducting said modified flashing stage at a temperature of at least 120° C. to sterilize bacteria comprising endotoxins.

16. A method for de-toxifying a water source, said method comprising: mixing said water source with acid to at least neutralize acidic proteins, thereby producing an acidified water source;
feeding said acidified water source to an ultrafiltration unit (UF) to reject at least a portion of the proteins, thereby producing an UF product stream and an UF reject stream;
subjecting said UF product stream to a de-carbonator, or a de-aerator or combined de-carbonator or de-aerator to vent gases, thereby producing a de-gassed UF product stream;
feeding said de-gassed UF product stream to a nanofiltration unit (NF) to reject at least a portion of negatively charged endoxtoxins, thereby producing a NF product stream and a NF reject stream;
subjecting said NF product stream to an ion exchange unit (IE) to reject at least a portion of total hardness, thereby producing an IE product stream and IE reject brine.

17. The method of claim 16, wherein said water source is toxic reverse osmosis reject brine derived from a wastewater treatment and reclamation plant (WWTRP).

18. The method of claim 16, further comprising replacing said NF by a reverse osmosis unit (RO) to produce a RO product stream and a RO reject stream, and recycling at least a portion of said RO product stream for mixing with said de-gassed UF product stream to reduce the total hardness of said de-gassed UF product stream.

19. The method of claim 16, further comprising neutralizing the pH of said de-gassed UF product stream.

20. The method of claim 16, further comprising producing a distillate stream and a de-scaled reject brine stream by a recycle brine multi-stage flash (RB-MSF) train;
wherein said RB-MSF train comprises a brine heater and a heat gain section, wherein said heat gain section comprises a plurality of flashing stages arranged in series, and wherein each of said flashing stages comprises a flashing zone and a heating zone, wherein a first set of pre-heating tubes and a second set of pre-heating tubes pass through said heating zone of each of said flashing stages;
wherein said RB-MSF train further comprises a first modified flashing stage and a second modified flashing stage, wherein said first modified flashing stage comprises said first set of pre-heating tubes, wherein said second modified flashing stage comprises said first set of pre-heating tubes and said second set of pre-heating tubes;
wherein a feed stream, which comprises said IE reject brine and produced water, enters said first set of pre-heating tubes, which passes through the flashing stages of said heat gain section and said second modified flashing stage, thereby producing a pre-heated feed stream at the exit of said second modified flashing stage;
wherein at least a portion of said de-scaled reject brine stream is mixed with said NF reject stream to form recycle brine, wherein said recycle brine enters said second set of pre-heating tubes, which passes, in series, through the flashing stages of said heat gain section, said second modified flashing stage, and said first modified flashing stage, before passing through said brine heater to gain further heat, thereby producing a heated brine stream at the exit of said brine heater; wherein:

(a) said pre-heated feed stream is released in said first modified flashing stage to be contacted with said heated brine stream, thereby said pre-heated feed stream is de-carbonated, de-gassed, or sterilized, or combinations thereof by the vapor flashed from said heated brine stream, whereby evolved gases and formed first precipitates comprises calcium sulfates, magnesium hydroxide, or calcium carbonate, and combinations thereof are removed from said first modified flashing stage to produce a first mixed brine stream;

(b) said first mixed brine stream is released in said second modified flashing stage to be contacted with an organic hydroxide source to form second precipitates calcium sulfates, magnesium hydroxide, or magnesium silicate, and combinations thereof, and simultaneously recovering said organic hydroxide source, wherein the recovered organic hydroxide source is recycled to said second modified flashing stage, and said second precipitates are removed from said second modified flashing stage to produce a second mixed brine stream, wherein said organic hydroxide source is selected from the group consisting of isopropylamine, propylamine, dipropylamine, diisopropylamine, ethylamine, diethylamine, methylamine, dimethylamine, ammonia, and combinations thereof; or (c) said first mixed brine stream is mixed with an inorganic source, and then the mixture is released in said second modified flashing stage to be contacted with said organic hydroxide source to form said second precipitates comprising magnesium sulfosilicoaluminate, and simultaneously recover said organic hydroxide source, wherein the recovered organic hydroxide source is recycled to said second modified flashing stage, and said second precipitates are removed from said second modified flashing stage to produce said second mixed brine stream, wherein said inorganic source is selected from the group consisting of aluminum hydroxide, sodium aluminate, aluminum chloride, and combinations thereof; and wherein said second mixed brine stream enters a first flashing stage of said heat gain section and cascades from flashing stage to flashing stage within said heat gain section, thereby producing said distillate stream and said de-scaled reject brine stream, wherein at least a portion of said distillate stream is recycled to said de-gassed UF product stream.

\* \* \* \* \*